US008559305B2

(12) United States Patent
Miyazawa et al.

(10) Patent No.: US 8,559,305 B2
(45) Date of Patent: Oct. 15, 2013

(54) COMMUNICATION DEVICE, COMMUNICATION METHOD, AND COMPUTER PROGRAM PRODUCT

(75) Inventors: Jun Miyazawa, Chiryu (JP); Kenji Oike, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 303 days.

(21) Appl. No.: 13/029,586

(22) Filed: Feb. 17, 2011

(65) Prior Publication Data

US 2011/0211469 A1    Sep. 1, 2011

(30) Foreign Application Priority Data

Feb. 26, 2010    (JP) ................................. 2010-041570

(51) Int. Cl.
*H04L 12/26*    (2006.01)
*H04W 4/00*    (2009.01)
*H04J 3/14*    (2006.01)

(52) U.S. Cl.
USPC ............ 370/230; 370/235; 370/329; 370/341

(58) Field of Classification Search
None
See application file for complete search history.

(56) References Cited

U.S. PATENT DOCUMENTS

| | | | |
|---|---|---|---|
| 7,327,681 B2* | 2/2008 | Rhee et al. ..................... 370/235 |
| 2006/0063533 A1* | 3/2006 | Matoba et al. ............. 455/452.2 |
| 2008/0037553 A1* | 2/2008 | Gilmartin et al. ........ 370/395.41 |
| 2008/0273553 A1* | 11/2008 | Wang et al. .................... 370/468 |
| 2009/0006626 A1* | 1/2009 | Yamagishi .................... 709/226 |
| 2009/0122716 A1* | 5/2009 | Hayashi ........................ 370/252 |

OTHER PUBLICATIONS

Jun. 6, 2011 Search Report Issued in European Patent Application No. 11155230.3.
Cao, "Inline Network Measurement: TCP Built-in Techniques for Inferring End-to-end Bandwidth", Jan. 2007, pp. i-102, Graduate School of Information Science and Technology, Osaka University.
Jain et al., "End-to-End Available Bandwidth: Measurement Methodology, Dynamics, and Relation with TCP Throughput", Oct. 1, 2002, pp. 295-308, vol. 32, No. 4, Computer Communication Review, ACM, New York, US.

(Continued)

*Primary Examiner* — Chi Pham
*Assistant Examiner* — Soon-Dong D Hyun
(74) *Attorney, Agent, or Firm* — Oliff & Berridge, PLC

(57) ABSTRACT

A communication device transmits a plurality of measurement packets to another communication device while successively varying a transmitting interval. After the plurality of measurement packets have been transmitted, the communication device determines a location of a usable bandwidth in relation to a first bandwidth range that is a range within which bandwidths are measured. The communication device resets the first bandwidth range to a second bandwidth range that is a range within which the bandwidths are measured and in which at least one of an upper limit and a lower limit is different from the corresponding limit in the first bandwidth range in accordance with the determination. The communication device selects a bandwidth that will be used when the measurement packets are transmitted. The communication device transmits the measurement packets to the other communication device using the bandwidth that has been selected.

11 Claims, 16 Drawing Sheets

(56) References Cited

OTHER PUBLICATIONS

Melander et al., "A New End-to-End Probing and Analysis Method for Estimating Bandwidth Bottlenecks", Nov. 27, 2000, pp. 415-420, IEEE Global Telecommunications Conference, New York, US.

Tsugawa et al.; "Implementation and evaluation of an inline network measurement algorithm and its application technique;" Technical Report of the Institute of Electronics, Information and Communication Engineers; Dec. 2005; pp. 1-6.

Le Thanh Man et al.; "A study on Inline Network Measurement Mechanism for Service Overlay Networks;" Technical Report of the Institute of Electronics, Information and Communication Engineers; Jan. 17, 2003; vol. 102, No. 565; pp. 1-8.

* cited by examiner

COMMUNICATION DEVICE, COMMUNICATION METHOD, AND COMPUTER PROGRAM PRODUCT

CROSS-REFERENCE TO RELATED APPLICATION

This application claims priority to Japanese Patent Application No. 2010-41570, filed Feb. 26, 2010, the disclosure of which is hereby incorporated by reference in its entirety.

BACKGROUND

The present disclosure relates to a communication device, a communication method, and a computer program product for a communication device that measure a bandwidth that can be used during communication.

In a case where a communication device transmits data through a network such as the Internet or the like, it is necessary for the communication device to transmit the data at a transmission rate that is suited to the capacity of the transmission channel that can be used. Hereinafter, the transmission channel capacity and the transmission rate will be called the bandwidth. The capacity of the transmission channel that can be used is called the usable bandwidth. The usable bandwidth varies according to circumstances such as the region, the provider, the time of day, and the like. It is therefore desirable for the communication device to select the bandwidth for transmitting data by matching the varying usable bandwidth.

A method for specifying the usable bandwidth is known. In this method, the communication device includes, in packets, time information for computing a packet transmission interval. The communication device successively transmits a plurality of packets while varying the bandwidth at the time of transmission by incrementally changing the transmission interval. Another communication device receives the packets and stores the packet receiving intervals. Thereafter, the differences between the stored receiving intervals and the transmission intervals that were computed based on the time information within the packets are computed. The usable bandwidth is specified based on a trend of changes in the computed plurality of differences.

The specifying of the usable bandwidth is performed for each one of a plurality of specified ranges of bandwidths. Hereinafter, the range of bandwidths is called the bandwidth range. The bandwidths that are used for transmitting the packets are selected from within the specified bandwidth range, starting with the widest bandwidth. The packets are transmitted in order using the selected bandwidth, and a determination is made as to whether a usable bandwidth exists within the specified bandwidth range. In a case where a usable bandwidth does not exist within the specified bandwidth range, the bandwidth range is extended. In a case where a usable bandwidth exists at a narrower bandwidth than the bandwidths within the specified bandwidth range, the bandwidth range is extended in the direction of the narrower bandwidths. In a case where a usable bandwidth exists at a wider bandwidth than the bandwidths within the specified bandwidth range, the bandwidth range is extended in the direction of the wider bandwidths. The determination as to whether a usable bandwidth exists within the extended bandwidth range is made repeatedly.

SUMMARY

In the method that is described above, the bandwidths that are used for transmitting the packets are selected from among the bandwidths in the specified bandwidth range after the range has been extended, starting with the widest bandwidth, irrespective of the position of the usable bandwidth in relation to the bandwidth range before the range is extended. The packets are transmitted in order using the selected bandwidths. Because priority is given to using the widest bandwidth, there is a strong possibility that a packet will be transmitted using a bandwidth that is wider than the usable bandwidth. In a case where a packet is transmitted using a bandwidth that is wider than the usable bandwidth, a problem arises in that the communication devices cannot transmit and receive the packets in a stable state. Furthermore, in a ease where the usable bandwidth is specified based on the extended bandwidth range when, for example, the usable bandwidth was narrower than the bandwidths in the bandwidth range prior to the extension, considerable time is required in order to specify the usable bandwidth, creating another problem in that the specifying process becomes less efficient.

Various exemplary embodiments of the broad principles derived herein provide a communication device, a communication method, and a computer program product for a communication device that are capable of specifying the usable bandwidth in a stable and efficient manner.

Exemplary embodiments provide a communication device that can be connected to a network includes a first transmitting portion that transmits a plurality of measurement packets to another communication device while successively varying a transmitting interval, a first determining portion that, in a case where the plurality of measurement packets have been transmitted by the first transmitting portion, determines a location of a usable bandwidth in relation to a first bandwidth range, based on a result packet that is transmitted from the other communication device, the first bandwidth range being a range within which bandwidths are measured, the usable bandwidth being one of the bandwidths that can be used in the network, and the result packet containing information that pertains to a relationship between the transmitting interval and a receiving interval at which the plurality of measurement packets are received by the other communication device, a range setting portion that resets the first bandwidth range to a second bandwidth range in accordance with a determination that has been made by the first determining portion, the second bandwidth range being a range within which the bandwidths are measured and in which at least one of an upper limit and a lower limit is different from the corresponding limit in the first bandwidth range, a selecting portion that, in order to determine whether the usable bandwidth is located within the second bandwidth range that has been set by the range setting portion, selects, from among a plurality of bandwidths that have been selected from within the second bandwidth range and based on the setting by the range setting portion, a bandwidth that will be used when the measurement packets are transmitted to the other communication device, and a second transmitting portion that transmits the measurement packets to the other communication device using the bandwidth that has been selected by the selecting portion.

Exemplary embodiments also provide a communication method includes the steps of transmitting a plurality of measurement packets to another communication device that is connected to a network while successively varying a transmitting interval, determining, in a case where the plurality of measurement packets have been transmitted, a location of a usable bandwidth in relation to a first bandwidth range, based on a result packet that is transmitted from the other communication device, the first bandwidth range being a range within which bandwidths are measured, the usable bandwidth being one of the bandwidths that can be used in the network, and the result packet containing information that pertains to a relationship between the transmitting interval and a receiving interval at which the measurement packets are received by the other communication device, resetting the first bandwidth range to a second bandwidth range in accordance with the determining of the location of the usable bandwidth in relation to the first bandwidth range, the second bandwidth range being a range within which the bandwidths are measured and in which at least one of an upper limit and a lower limit is different from the corresponding limit in the first bandwidth range, selecting, from among a plurality of bandwidths that have been selected from within the second bandwidth range and based on the setting of the second bandwidth range, a bandwidth that will be used when the measurement packets are transmitted to the other communication device, in order to determine whether the usable bandwidth is located within the second bandwidth range that has been set; and transmitting the measurement packets to the other communication device using the selected bandwidth.

Exemplary embodiments further provide a computer program product stored on a non-transitory computer-readable medium includes instructions for causing a computer of a communication device that is connected to a network to carry out communication with another communication device to perform the steps of transmitting a plurality of measurement packets to another communication device (1) that is connected to a network (8) while successively varying a transmitting interval, determining, in a case where the plurality of measurement packets have been transmitted, the location of a usable bandwidth in relation to a first bandwidth range, based on a result packet that is transmitted from the other communication device, the first bandwidth range being a range within which bandwidths are measured, the usable bandwidth being one of the bandwidths that can be used in the network, and the result packet containing information that pertains to a relationship between the transmitting interval and a receiving interval at which the measurement packets are received by the other communication device, resetting the first bandwidth range to a second bandwidth range in accordance with the determining of the location of the usable bandwidth in relation to the first bandwidth range, the second bandwidth range being a range within which the bandwidths are measured and in which at least one of an upper limit and a lower limit is different from the corresponding limit in the first bandwidth range, selecting, from among a plurality of bandwidths that have been selected from within the second bandwidth range and based on the setting of the second bandwidth range, a bandwidth that will be used when the measurement packets are transmitted to the other communication device, in order to determine whether the usable bandwidth is located within the second bandwidth range that has been set, and transmitting the measurement packets to the other communication device using the selected bandwidth.

BRIEF DESCRIPTION OF THE DRAWINGS

Exemplary embodiments will be described below in detail with reference to the accompanying drawings in which.

DETAILED DESCRIPTION OF THE EXEMPLARY EMBODIMENTS

Figure 1:
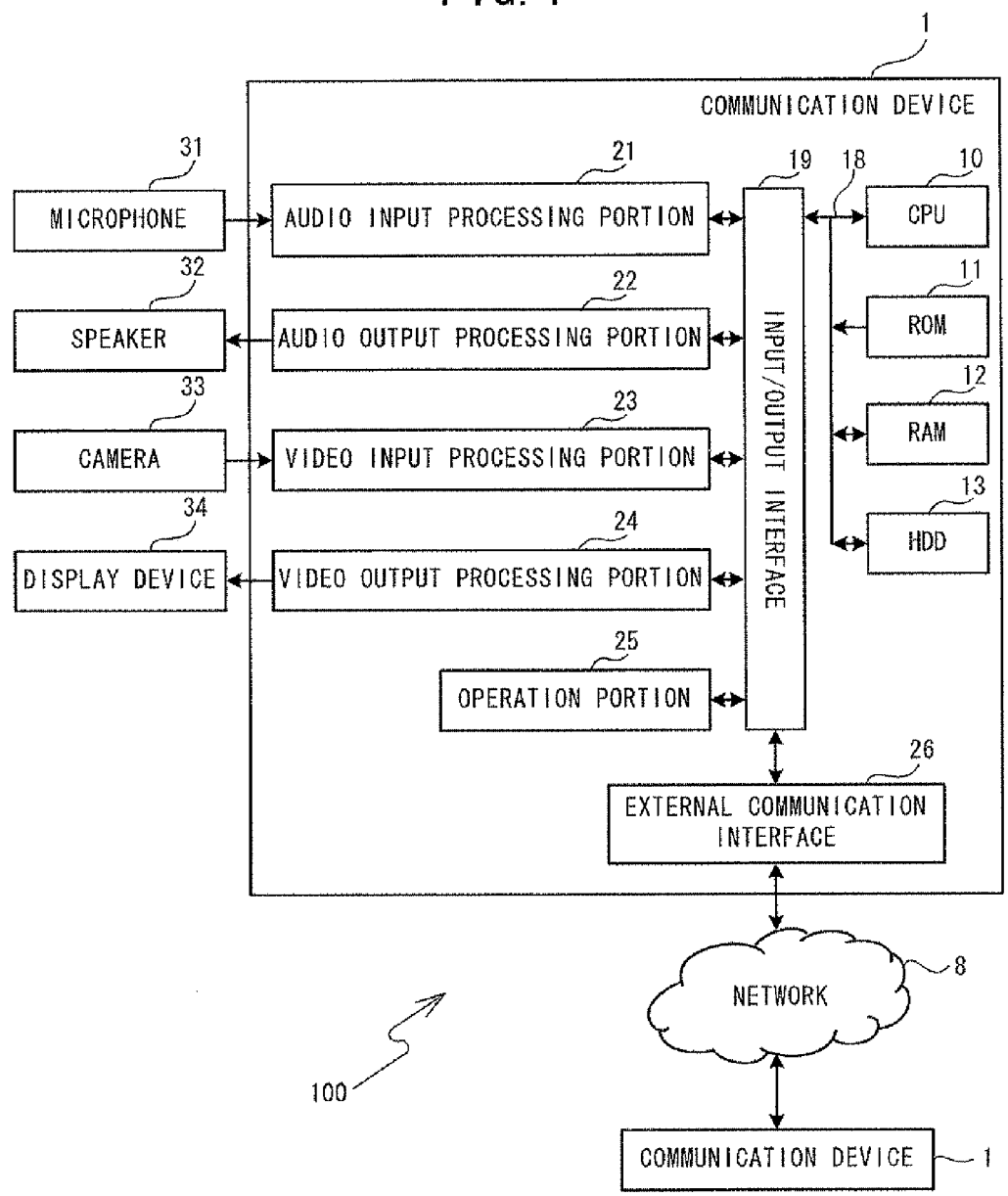
FIG. 1 is a diagram that shows an electrical configuration of a communication device 1 and a configuration of a bandwidth measurement system 100.

Hereinafter, a communication device 1 that is an embodiment that makes tangible a communication device of the present disclosure and a bandwidth measurement system 100 that is provided with a plurality of the communication devices 1 will be explained with reference to the drawings. Note that the referenced drawings are used for explaining the technological characteristics that are utilized by the present disclosure. Device configurations, flowcharts of various types of processing, and the like that are shown in the drawings are merely explanatory examples and do not purport to limit the present disclosure only to those examples.

The bandwidth measurement system 100 will be explained. As shown in FIG. 1, the bandwidth measurement system 100 is provided with at least two of the communication devices 1. One of the communication devices 1 is connected to one of the other communication devices 1 through a network 8. The communication devices 1 perform communication of various types of data between one another.

The bandwidth measurement system 100 in the present embodiment is a video conferencing system by which users in a plurality of locations conduct video conferences. The communication devices 1 share video and audio for the plurality of locations by transmitting and receiving image data and audio data to and from one another. The communication devices 1 are capable of carrying out data communication through the network 8. Specifically, the communication devices 1 may be video conferencing terminals that are placed in each of the locations in order to conduct the video conferences, and the communication devices 1 may also be personal computers that various types of information processing.

In the bandwidth measurement system 100, each of the communication devices 1 forms the image data and the audio data into packets and transmits the packets. At the same time, each of the communication devices 1 measures the bandwidth between itself and each of the other communication devices 1 and specifies the usable bandwidth. The usable bandwidth is the maximum transmission rate at which the communication device 1 on the receiving side is able to receive the data at a transmission rate that is nearly equal to the transmission rate at which the communication device 1 on the transmitting side transmits the data. If the packets are transmitted at a transmission rate that exceeds the usable bandwidth, packet losses, communication delays, and the like will occur. On the other hand, if the transmission rate is too low, the usable bandwidth will not be fully utilized, and efficiency will be poor. Therefore, the communication device 1 controls the transmission rate (the bandwidth) that is used such that it matches the specified usable bandwidth. Note that bandwidth will be expressed in units of bits per second (bps) in order to compare the bandwidth with the transmission rate between the communication devices 1.

An electrical configuration of the communication device 1 will be explained. As shown in FIG. 1, the communication device 1 is provided with a CPU 10 that performs control of the communication device 1. A ROM 11, a RAM 12, a hard disk drive (HDD) 13, and an input/output interface 19 are connected to the CPU 10 through a bus 18.

The ROM 11 stores a program for operating the communication device 1, as well as an initial value and the like. The RAM 12 temporarily stores various types of information that are used by a control program. The HDD 13 is a non-volatile storage device that stores various types of information such as the control program and the like. A storage device such as an EEPROM, a memory card, or the like may also be used instead of the HDD 13.

An audio input processing portion 21, an audio output processing portion 22, a video input processing portion 23, a video output processing portion 24, an operation portion 25, and an external communication interface 26 are connected to the input/output interface 19. The audio input processing portion 21 processes audio data that are output from a microphone 31. The audio output processing portion 22 controls the operation of a speaker 32. The video input processing portion 23 processes video data that are output from a camera 33 that captures video images. The video output processing portion 24 controls the operation of a display device 34 that displays the video images. The operation portion 25 is used by a user to input various types of commands to the communication device 1. The operation portion 25 may also be connected to the input/output interface 19 from outside the communication device 1. The external communication interface 26 connects the communication device 1 to the network 8.

Next, a simple overview of the bandwidth measurement method that is used by the bandwidth measurement system 100 in the present embodiment will be explained. The bandwidth measurement method that is used by the bandwidth measurement system 100 is a known method.

The bandwidth measurement method will be explained. In the bandwidth measurement system 100, the communication device 1 that transmits the data packetizes the data into a plurality of measurement packets. Hereinafter, the communication device 1 that transmits the measurement packets will be called the transmitting device. The transmitting device successively transmits the plurality of measurement packets to another of the communication devices 1 through the network 8. Hereinafter, the other communication device 1 will be called the receiving device. If the bandwidth (bps) that is used for transmitting the measurement packets is not greater than the usable bandwidth (bps), the flow of the measurement packets will not be impeded. In this case, the interval at which the measurement packets that are transmitted by the transmitting device are received by the receiving device is ideally the same as the interval at which the measurement packets are transmitted. Hereinafter, the interval at which the measurement packets are transmitted will be called the transmitting interval. The interval at which the measurement packets are received will be called the receiving interval. On the other hand, in a case where the bandwidth (bps) that is used for transmitting the measurement packets is greater than the usable bandwidth (bps), the flow of the measurement packets will be impeded, and the receiving interval will become longer than the transmitting interval.

As the transmitting device transmits the plurality of measurement packets, it incrementally lengthens the transmitting interval. The bandwidth that is used for transmitting the measurement packets is determined by the formula Bandwidth(bps)=Measurement packet size(bits)/
Transmitting interval(s).

When the plurality of measurement packets are transmitted as the transmitting interval is incrementally lengthened, the receiving interval will become longer than the transmitting interval when the bandwidth that is used becomes greater than the usable bandwidth. However, if the transmitting interval is lengthened and the bandwidth that is used for transmitting the measurement packets is not greater than the usable bandwidth, the receiving interval and the transmitting interval will be the same. Accordingly, the communication device 1 can specify as the usable bandwidth the transmission rate at the point when the relationship between the receiving interval and the transmitting interval changes.

Note that in the present embodiment, the communication device 1 identifies the point when the relationship between the receiving interval and the transmitting interval changes by computing the ratio of the transmitting interval to the receiving interval. In a state in which the bandwidth that is used for transmitting the measurement packets is not greater than the usable bandwidth and the receiving interval is not longer than the transmitting interval, the ratio of the transmitting interval to the receiving interval is equal to 1. Note that in some cases, the transmitting interval and the receiving interval will not actually be perfectly equal. In the present embodiment, in a case where the ratio of the transmitting interval to the receiving interval is within a specified range that includes the value 1, the communication device 1 treats the ratio as being equal to 1. If the bandwidth that is used for transmitting the measurement packets is greater than the usable bandwidth, the ratio of the transmitting interval to the receiving interval is less than 1. In the present embodiment, in a case where the ratio is less than the specified range, the ratio is treated as being less than 1. The communication device 1 specifies the usable bandwidth by determining whether the ratio is equal to 1 or less than 1. Note that the method of specifying the usable bandwidth in the present disclosure is not limited to the method that has been described here. The communication device 1 may also specify the usable bandwidth by computing the difference between the receiving interval and the transmitting interval.

The measurement procedure will be explained. In the bandwidth measurement system 100, broadly speaking, the bandwidth is measured, and the usable bandwidth is specified, by the step that is described below.

1. Set a bandwidth range.

The communication device 1 is able to measure the bandwidth efficiently and specify the usable bandwidth by restricting the bandwidth range within which it is anticipated that the usable bandwidth can be specified.

2. Transmit and receive the plurality of measurement packets in accordance with the bandwidth range.

First, conditions for transmitting the plurality of measurement packets are set. The transmission conditions include the number of measurement packets, the size of each of the measurement packets, and the transmitting interval for the measurement packets. The transmitting interval is set such that it is lengthened incrementally. Therefore, the bandwidths within the bandwidth range are selected in order from the end of the bandwidth range where the transmission rate is the fastest to the end of the bandwidth range where the transmission rate is the slowest. Hereinafter, the end where the transmission rate is the fastest is called the wide bandwidth side. The end where the transmission rate is the slowest is called the narrow bandwidth side. The selected bandwidth is used for transmitting the measurement packets. The measurement packets are successively transmitted from the transmitting device to the receiving device in accordance with the transmission conditions that have been set.

3. Specify the usable bandwidth based on the ratio of the transmitting interval to the receiving interval.

The plurality of measurement packets that are transmitted from the transmitting device are received by the receiving device. After receiving the plurality of measurement packets, the receiving device computes the receiving intervals based on the times at which the measurement packets were actually received. The ratios of the transmitting intervals to the receiving intervals are computed from the transmitting intervals that are contained in the measurement packets and the receiving intervals that have been computed. The point when the value of the ratio of the transmitting interval to the receiving interval changes is thus detected. The transmission rate at the detected point in time is computed based on the measurement packet size and is then specified as the usable bandwidth. In a case where the point when the value of the ratio of the transmitting interval to the receiving interval changes is not detected, either the usable bandwidth is to the wide bandwidth side from the bandwidth range or the usable bandwidth is to the narrow bandwidth side from the bandwidth range. Information that pertains to the usable bandwidth is stored in a result packet. The result packet is transmitted from the receiving device to the transmitting device. The result packet is received by the transmitting device.

4. Reset the bandwidth range, return to step 2 above.

In the transmitting device, the bandwidth range is reset based on the information that is contained in the received result packet. The bandwidths are then measured again based on the reset bandwidth range. For example, in a case where information to the effect that the usable bandwidth is within the bandwidth range is contained in the result packet, the bandwidth range is reduced to a narrower range that contains the usable bandwidth. The bandwidth measurement is then repeated based on the bandwidth range that has been reset. In a case where a bandwidth is selected from within the bandwidth range that has been reset, a bandwidth with a higher resolution is selected. The usable bandwidth can therefore be specified accurately in a short time. To take another example, in a case where information to the effect that the usable bandwidth is to the narrow bandwidth side from the bandwidth range is contained in the result packet, the bandwidth range is extended in the direction of the narrower bandwidths. In a case where information to the effect that the usable bandwidth is to the wide bandwidth side from the bandwidth range is contained in the result packet, the bandwidth range is extended in the direction of the wider bandwidths. The bandwidths are then measured based on the bandwidth range that has been reset. Thus repeated attempts are made to specify the usable bandwidth.

In the present embodiment, the method for measuring the bandwidth within the bandwidth range that has been reset is determined according to the position of the usable bandwidth in relation to the bandwidth range before the bandwidth range is reset. Specifically, the bandwidth within the bandwidth range that has been reset is measured, and the usable bandwidth is specified, based on measurement methods that differ according to whether 1) the usable bandwidth is to the narrow bandwidth side from the bandwidth range before the bandwidth range is reset, 2) the usable bandwidth is to the wide bandwidth side from the bandwidth range before the bandwidth range is reset, or 3) the usable bandwidth is within the bandwidth range before the bandwidth range is reset. Thus the measurement that is based on the bandwidth range that has been reset is performed stably and in a short time. Hereinafter, the respective measurement methods will be explained.

The bandwidth measurement methods that are based on the bandwidth range that has been reset will be explained with reference to FIGS. 2 to 4. The bandwidth measurement method that is used in a case where 1) the usable bandwidth is to the narrow bandwidth side from the bandwidth range before the bandwidth range is reset will be explained with reference to FIG. 2. The transmitting device first sets a bandwidth range 41 and measures the bandwidths. A usable bandwidth 51 is located to the narrow bandwidth side from the bandwidth range 41. A specified number of bandwidths are selected within the bandwidth range 41. The measurement packets are transmitted using the selected bandwidths in order from the wide bandwidth side toward the narrow bandwidth side (arrow 47). After all of the measurement packets have been transmitted from the transmitting device, a determination is made in the receiving device as to whether the usable bandwidth 51 is located to the narrow bandwidth side from the bandwidth range 41. The determination result is stored in the result packet. The result packet is transmitted from the receiving device to the transmitting device. A determination is made in the transmitting device as to whether the usable bandwidth 51 is located to the narrow bandwidth side from the bandwidth range 41.

The transmitting device resets the bandwidth range. Because the usable bandwidth 51 is located to the narrow bandwidth side from the bandwidth range 41, the bandwidth range 41 is extended in the direction of the narrower bandwidths, and a bandwidth 42 is obtained. The transmitting device sets the conditions for transmitting the measurement packets for measuring the bandwidths within the bandwidth range 42. Unlike when the bandwidths were measured based on the bandwidth range 41, the transmitting intervals are set such that they become incrementally shorter. A specified number of bandwidths are selected within the bandwidth range 42. The selected bandwidths are selected in order from the narrow bandwidth side to the wide bandwidth side. The measurement packets are transmitted one at a time using the selected bandwidths in order (arrow 50). The receiving device receives the measurement packets. The receiving device computes the ratio of the transmitting interval to the receiving interval based on the transmitting interval and the receiving interval. The computation result is stored in the result packet. The result packet is transmitted from the receiving device to the transmitting device. In the transmitting device, a determination is made, based on the computation result that is contained in the result packet, as to whether the bandwidth that was used for transmitting the measurement packets is the usable bandwidth. In a case where it is determined that the bandwidth that was used for transmitting is not the usable bandwidth, the next measurement packet is transmitted using the next bandwidth in the wide bandwidth direction.

Figure 2:
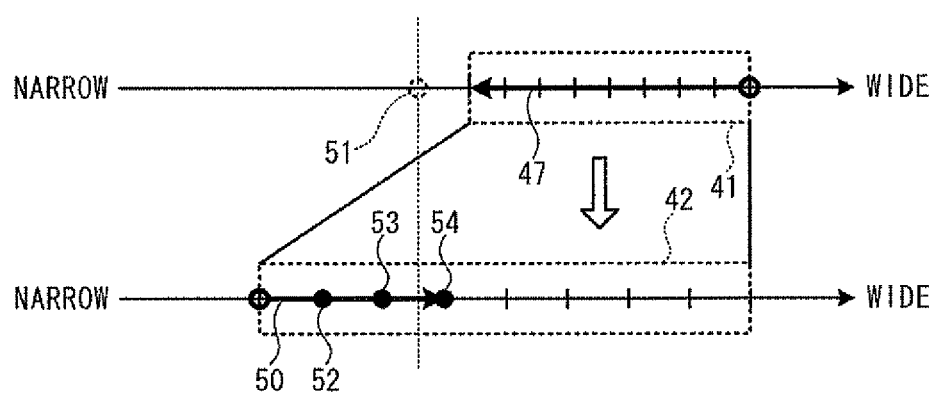
FIG. 2 is a diagram that shows measurement of a bandwidth within a bandwidth range.

As shown in FIG. 2, the measurement packet is transmitted using a bandwidth 52. Because the bandwidth 52 is to the narrow bandwidth side from the usable bandwidth 51, the ratio of the transmitting interval to the receiving interval that is computed in the receiving device is 1. The computation result is stored in the result packet and is transmitted from the receiving device to the transmitting device. Next, the measurement packet is transmitted using a bandwidth 53. Because the bandwidth 53 is to the narrow bandwidth side from the usable bandwidth 51, the computed ratio of the transmitting interval to the receiving interval becomes 1. The computation result is stored in the result packet and is transmitted from the receiving device to the transmitting device. Next, the measurement packet is transmitted using a bandwidth 54. Because the bandwidth 54 is to the wide bandwidth side from the usable bandwidth 51, the computed ratio of the transmitting interval to the receiving interval becomes less than 1. The computation result is stored in the result packet and is transmitted from the receiving device to the transmitting device. The computation result changes between the case where the bandwidth 53 was used and the case where the bandwidth 54 was used. The transmitting device specifies the bandwidth 53 as the usable bandwidth.

In a case where the measurement packet is transmitted using a bandwidth that is to the wide bandwidth side from the usable bandwidth 51, the measurement packet is transmitted over the network 8 in an unstable state. Therefore, cases will occur in which the receiving device is unable to receive the measurement packets in a stable manner, and the receiving interval becomes unstable. In these sorts of cases, the transmitting device cannot specify the usable bandwidth 51 accurately. In the present embodiment, this problem is addressed by first selecting the bandwidth 52 that is the farthest to the narrow bandwidth side within the bandwidth range 42 that has been reset, and by using the bandwidth 52 as the bandwidth for transmitting the measurement packet. Furthermore, the bandwidths 52, 53, and 54 within the bandwidth range 42 that has been reset are used in order from the narrow bandwidth side to the wide bandwidth side. Priority is given to transmitting the measurement packets using the bandwidths on the narrow bandwidth side. It is thus possible to reliably prevent the transmitting device from transmitting the measurement packets using a bandwidth that is to the wide bandwidth side from the usable bandwidth 51. The receiving device is therefore able to receive the measurement packets in a stable manner. The transmitting device is thus able to specify the usable bandwidth 51 accurately. Furthermore, because the bandwidths are used in order from the narrow bandwidth side to the wide bandwidth side, the bandwidths within the bandwidth range 42 can be selected without any of the bandwidths being missed. The transmitting device is thus able to reliably specify the usable bandwidth 51.

The bandwidth measurement method that is used in a case where 2) the usable bandwidth is to the wide bandwidth side from the bandwidth range before the bandwidth range is reset will be explained with reference to FIG. 3. A usable bandwidth 55 is located to the wide bandwidth side from a bandwidth range 43 before the bandwidth range is reset. A specified number of bandwidths are selected from within the bandwidth range 43. The measurement packets are transmitted using the selected bandwidths in order from the wide bandwidth side to the narrow bandwidth side (arrow 48). In the receiving device, a determination is made as to whether the usable bandwidth 55 is located to the wide bandwidth side from the bandwidth range 43. The determination result is stored in the result packet and is transmitted from the receiving device to the transmitting device.

The transmitting device resets the bandwidth range. Because the usable bandwidth 55 is to the wide bandwidth side from the bandwidth range 43, the bandwidth range 43 is extended in the direction of the wider bandwidths, and a bandwidth range 44 is obtained. The transmitting device sets the conditions for transmitting the measurement packets for measuring the bandwidths within the bandwidth range 44. Unlike when the bandwidths were measured based in the bandwidth range 43, the transmitting intervals are set such that the bandwidths that will be used for transmitting the measurement packets will be contained within a bandwidth range 45 that is within the bandwidth range 44 and outside the bandwidth range 43. A specified number of bandwidths are selected from within the bandwidth range 45. The bandwidths that are used for transmitting the measurement packets are selected by a binary search from among the selected bandwidths that are within the bandwidth range 45. The transmitting device transmits the measurement packets one at a time using the selected bandwidths. The transmitting device receives a result packet that contains, as a computation result, the ratio of the transmitting interval to the receiving interval. Based on the computation result, the transmitting device determines whether the bandwidth that was used for transmitting the measurement packets is the usable bandwidth. In a case where it is determined that the bandwidth that was used for transmitting is not the usable bandwidth, the next measurement packet is transmitted using the next bandwidth that is selected by the binary search.

Figure 3:
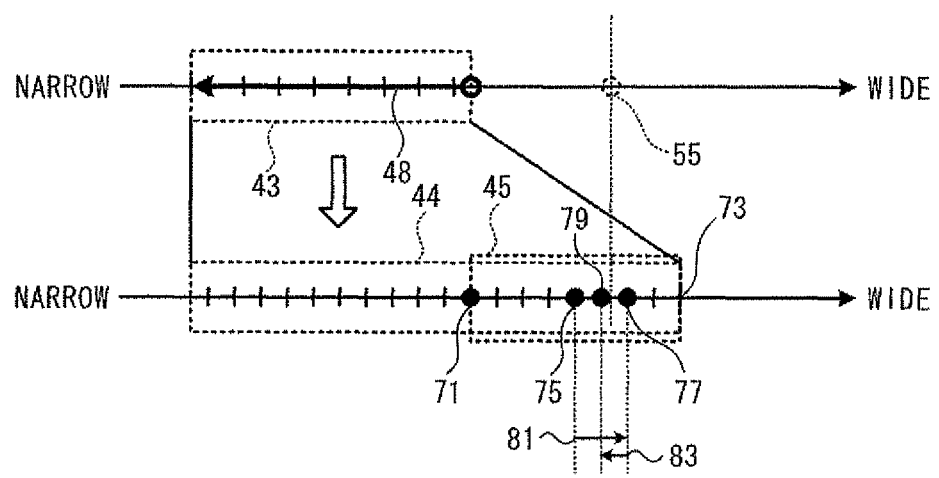
FIG. 3 is a diagram that shows measurement of a bandwidth within a bandwidth range.

As shown in FIG. 3, a bandwidth 75 that is in the center of the bandwidth range 45 is selected first. The measurement packets are transmitted using the selected bandwidth. 75. The bandwidth 75 is to the narrow bandwidth side from the usable bandwidth 55 (the ratio of the transmitting interval to the receiving interval equals 1). Next, a bandwidth 77 is selected (arrow 81) that is midway between the bandwidth 75 and a bandwidth 73 that is the farthest to the wide bandwidth side within the bandwidth range 45. The measurement packets are transmitted using the selected bandwidth 77. The bandwidth 77 is to the wide bandwidth side from the usable bandwidth 55 (the ratio of the transmitting interval to the receiving interval is less than 1). The ratio of the transmitting interval to the receiving interval has changed, so the usable bandwidth is between the bandwidth 75 and the bandwidth 77. Next, a bandwidth 79 is selected (arrow 83) that is midway between the bandwidth 75 and the bandwidth 77. The bandwidth 79 is to the narrow bandwidth side from the usable bandwidth 55 (the ratio of the transmitting interval to the receiving interval equals 1). Furthermore, the bandwidth 79 is to the narrow bandwidth side from the bandwidth 77, for which the ratio is different. The transmitting device specifies the bandwidth 79 as the usable bandwidth.

In a case where it has been determined that the usable bandwidth 55 is to the wide bandwidth side from the bandwidth range 43, there is a strong possibility that the usable bandwidth 55 will be within the bandwidth range 45, which is within the bandwidth range 44 and outside the bandwidth range 43. The transmitting device gives priority to selecting the bandwidths within the bandwidth range 45, where there is a strong possibility that the usable bandwidth is located, and uses the selected bandwidths for transmitting the measurement packets. The transmitting device is thus able to specify the usable bandwidth efficiently and in a shorter time. The transmitting device also uses the binary search to successively select the bandwidths and uses the selected bandwidths for transmitting the measurement packets. Because the bandwidths within the bandwidth range are used without any of the bandwidths being missed, the transmitting device is able to reliably specify the usable bandwidth. Furthermore, the usable bandwidth can be specified in a shorter time than in a case where the bandwidths are selected in order from the narrow bandwidth side to the wide bandwidth side.

The bandwidth measurement method that is used in a case where 3) the usable bandwidth is within the bandwidth range before the bandwidth range is reset will be explained with reference to FIG. 4. A usable bandwidth 56 is located within a bandwidth range 58 before the bandwidth range is reset. A specified number of bandwidths are selected within the bandwidth range 58. The measurement packets are transmitted using the selected bandwidths in order from the wide bandwidth side toward the narrow bandwidth side (arrow 49). A determination is made in the receiving device that the usable bandwidth 56 is located within the bandwidth range 58. A bandwidth 57 is specified that is to the narrow bandwidth side in relation to the usable bandwidth 56. The result packet that contains the determination result is transmitted from the receiving device to the transmitting device. Note that because the resolution of the transmitting interval that is used for transmitting the measurement packets is low, the bandwidth 57 does not perfectly match the actual usable bandwidth 56. Hereinafter, the bandwidth 57 is called the target bandwidth 57.

The transmitting device resets the bandwidth range. Because the target bandwidth 57 is located within the bandwidth range 58, the bandwidth range is reduced to a narrower range (a bandwidth range 46) that includes the target bandwidth 57. The transmitting device sets the conditions for transmitting the measurement packets for measuring the bandwidths within the bandwidth range 46. A specified number of bandwidths are selected within the bandwidth range 46. Because the bandwidth range has been reduced, the resolutions of the selected bandwidths are high. Unlike when the bandwidths were measured based on the bandwidth range 58, the transmitting intervals for the measurement packets are set such that the bandwidths that are used for transmitting the measurement packets are selected from among the selected bandwidths in order starting with the bandwidth that is closest to the target bandwidth 57. The transmitting device transmits the measurement packets one at a time. The transmitting device receives a result packet that contains, as a computation result, the ratio of the transmitting interval to the receiving interval. Based on the computation result that is contained in the received result packet, the transmitting device determines whether the bandwidth that was used for transmitting the measurement packets is the usable bandwidth. In a case where it is determined that the bandwidth that was used for transmitting is not the usable bandwidth, the next measurement packet is transmitted using the next selected bandwidth.

Figure 4:
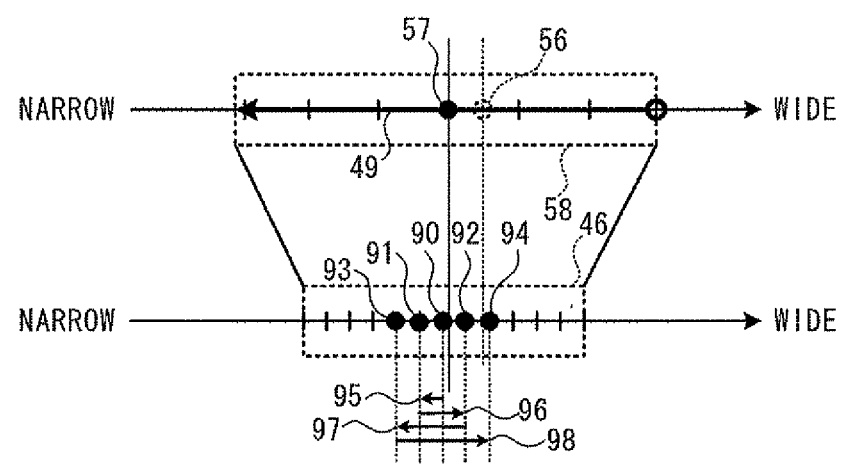
FIG. 4 is a diagram that shows measurement of a bandwidth within a bandwidth range.

As shown in FIG. 4, a bandwidth 90 that is the closest to the target bandwidth 57 is selected first. The measurement packets are transmitted using the selected bandwidth 90. The bandwidth 90 is to the narrow bandwidth side from the usable bandwidth 56 (the ratio of the transmitting interval to the receiving interval equals 1). Next, a bandwidth 91 is selected (arrow 95) that is adjacent to the bandwidth 90 on the narrow bandwidth side. The measurement packet is transmitted using the selected bandwidth 91. The bandwidth 91 is to the narrow bandwidth side from the usable bandwidth 56 (the ratio of the transmitting interval to the receiving interval equals 1). Next, a bandwidth 92 is selected (arrow 96) that is adjacent to the bandwidth 90 on the wide bandwidth side. The measurement packet is transmitted using the selected bandwidth 92. The bandwidth 92 is to the narrow bandwidth side from the usable bandwidth 56 (the ratio of the transmitting interval to the receiving interval equals 1). Next, a bandwidth 93 is selected (arrow 97) that is the closest to the bandwidth 90 among the unmeasured bandwidths on the narrow bandwidth side of the bandwidth 90. The measurement packet is transmitted using the selected bandwidth 93. The bandwidth 93 is to the narrow bandwidth side from the usable bandwidth 56 (the ratio of the transmitting interval to the receiving interval equals 1). Next, a bandwidth 94 is selected (arrow 98) that is the closest to the bandwidth 90 among the unmeasured bandwidths on the wide bandwidth side of the bandwidth 90. The measurement packet is transmitted using the selected bandwidth 94. The bandwidth 94 is to the wide bandwidth side from the usable bandwidth 56 (the ratio of the transmitting interval to the receiving interval is less than 1). The ratio for the bandwidth 94 has changed from that for the adjacent bandwidth 92. Between the bandwidth 92 and the bandwidth 94, the transmitting device specifies the bandwidth 92, which is to the narrow bandwidth side, as the usable bandwidth. A bandwidth that is closer to the usable bandwidth 56 can thus be specified.

As described above, in a case where the usable bandwidth 56 is located within the bandwidth range 58 before the bandwidth range is reset, the transmitting device selects the bandwidths from among the plurality of bandwidths that have been selected within the bandwidth range 46 after the bandwidth range has been reset, starting with the bandwidth 90 that is the closest to the target bandwidth 57, and uses the selected bandwidths for transmitting the measurement packets. Because the resolutions of the bandwidths that are selected within the bandwidth range 46 are higher, the usable bandwidth can be specified more accurately. Because the measurement packets are transmitted with priority given to the bandwidths that are closest to the target bandwidth 57, the transmitting device is able to specify the usable bandwidth in a short time. Furthermore, the usable bandwidth varies repeatedly in accordance with the network environment. Therefore, there is a possibility that the target bandwidth 57 that is specified based on the bandwidth range 58 will vary until the usable bandwidth is next specified based on the bandwidth range 46. However, in a case where the bandwidths are measured based on the bandwidth range 46, the transmitting device selects the bandwidths in order, starting with the bandwidth that is closest to the specified target bandwidth 57, and uses the selected bandwidths for transmitting the measurement packets. Thus, even in a case where the usable bandwidth has changed, the transmitting device is able to specify the usable bandwidth after it has changed, reliably and in a short time.

In the explanation above, after the bandwidth range has been reset, the receiving device computes the ratio of the transmitting interval to the receiving interval, stores the ratio in the result packet, and transmits the result packet to the transmitting device. The present disclosure is not limited to this method. The receiving device may also transmit to the transmitting device a result packet that contains the receiving interval. The transmitting device may then compute the ratio of the transmitting interval to the receiving interval. The receiving device may also store a history of the computation results for the ratio of the transmitting interval to the receiving interval and may specify the usable bandwidth. The receiving device may then transmit to the transmitting device a result packet that contains the specified usable bandwidth.

Main processing and receiving processing that are performed by the CPU 10 of the communication device 1 will be explained with reference to FIGS. 5 to 14. The CPU 10 starts and performs the main processing and the receiving processing when the electric power supply to the communication device 1 is turned on.

The main processing will be explained with reference to FIGS. 5 to 12. When the main processing is started, a bandwidth range is set within which it is anticipated that the usable bandwidth can be specified (Step Si). The conditions for transmitting the measurement packets for measuring the bandwidth are set based on the bandwidth range that has been set. Bandwidths within the bandwidth range are selected in order from the wide bandwidth side to the narrow bandwidth side. The measurement packets are successively transmitted to another communication device 1 using one of the selected bandwidths (Step S3). In the other communication device 1, the location of the usable bandwidth in relation to the bandwidth range is specified. The result packet that contains the specified information is transmitted from the other communication device 1, and the result packet is received (Step S5). The location of the usable bandwidth in relation to the bandwidth range is specified based on the information that is contained in the received result packet.

In a case where the usable bandwidth is specified as being located to the narrow bandwidth side from the bandwidth range (YES at Step S7), processing to specify the usable bandwidth that is located to the narrow bandwidth side (narrow bandwidth measurement processing; refer to FIG. 6) is performed (Step S9). In a case where the usable bandwidth is specified as being located to the wide bandwidth side from the bandwidth range (NO at Step S7; YES at Step S11), processing to specify the usable bandwidth that is located to the wide bandwidth side (wide bandwidth measurement processing; refer to FIG. 7) is performed (Step S13). In a case where the usable bandwidth is specified as being located within the bandwidth range (NO at Step S11), processing to specify the usable bandwidth more specifically within the bandwidth range (bandwidth measurement processing) is performed (Step S15).

Figure 6:
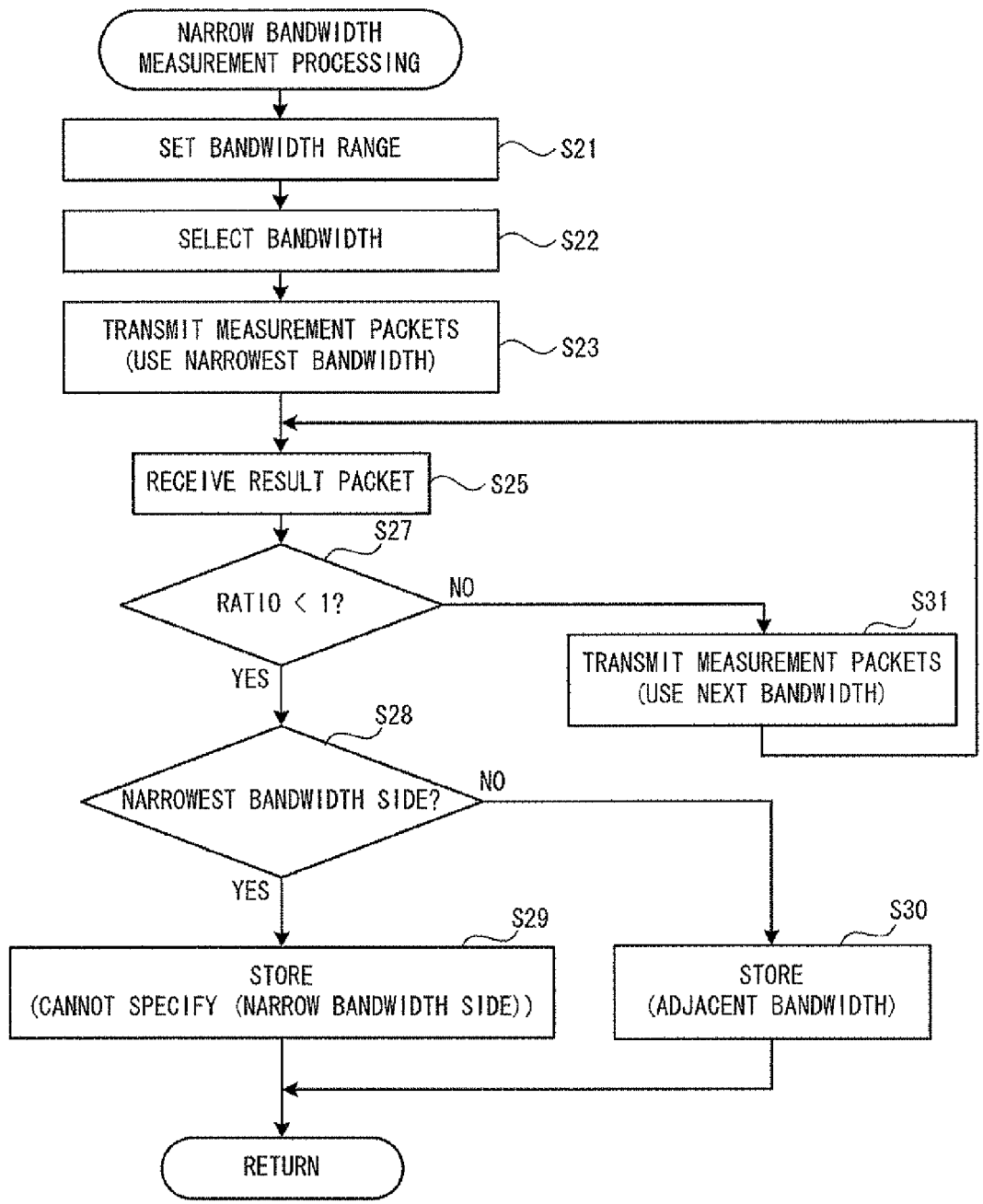
FIG. 6 is a flowchart that shows narrow bandwidth measurement processing.

The narrow bandwidth measurement processing will be explained with reference to FIG. 6. The bandwidth range is reset (Step S21). Because the usable bandwidth is located to the narrow bandwidth side from the bandwidth range before the bandwidth range is reset, the bandwidth range is extended to the narrow bandwidth side. The conditions are set for transmitting the measurement packets for measuring the bandwidths within the reset bandwidth range. The bandwidth that is the farthest to the narrow bandwidth side among the plurality of bandwidths that have been selected within the reset bandwidth range is selected (Step S22). The measurement packet is transmitted to the other communication device 1 using the selected bandwidth (Step S23). The bandwidth that is used for transmitting the measurement packet is hereinafter called the used bandwidth. The other communication device 1 receives the measurement packet. The other communication device 1 computes the ratio of the transmitting interval to the receiving interval. The result packet that contains the ratio is transmitted from the other communication device 1, and the result packet is received (Step S25). The ratio of the transmitting interval to the receiving interval that is contained in the received result packet is the ratio for the measurement packet that was transmitted using the used bandwidth.

In a case where the ratio of the transmitting interval to the receiving interval is equal to 1 (NO at Step S27), the usable bandwidth is to the wide bandwidth side from the used bandwidth. The bandwidth that is adjacent to the used bandwidth on the wide bandwidth side is selected as the next used bandwidth. The measurement packet is transmitted using the next used bandwidth that has been selected (Step S31). The processing returns to Step S25.

In a case where the ratio of the transmitting interval to the receiving interval that is contained in the received result packet is less than 1 (YES at Step S27), it is possible that the bandwidth that is adjacent to the used bandwidth on the narrow bandwidth side is the usable bandwidth. A determination is made as to whether the used bandwidth is the bandwidth that is the farthest to the narrow bandwidth side within the reset bandwidth range (Step S28). In a case where the used bandwidth is the bandwidth that is the farthest to the narrow bandwidth side within the reset bandwidth range (YES at Step S28), the usable bandwidth is located to the narrow bandwidth side from the reset bandwidth range, so the usable bandwidth cannot be specified. Information to the effect that the usable bandwidth cannot be specified because the usable bandwidth is located to the narrow bandwidth side from the reset bandwidth range is stored in the RAM 12 (Step S29). The narrow bandwidth measurement processing is terminated, and the processing returns to the main processing (refer to FIG. 5). On the other hand, in a case where the used bandwidth is not the bandwidth that is the farthest to the narrow bandwidth side within the reset bandwidth range (NO at Step S28), the bandwidth that is adjacent to the used bandwidth on the narrow bandwidth side is specified as the usable bandwidth. The specified usable bandwidth is stored in the RAM 12 (Step S30). The narrow bandwidth measurement processing is terminated, and the processing returns to the main processing (refer to FIG. 5).

By performing the processing that is described above, the communication device 1 is able to transmit the measurement packets giving priority to using the bandwidths on the narrow bandwidth side. It is thus possible for to reliably prevent the communication device 1 from transmitting the measurement packets using a bandwidth that is to the wide bandwidth side from the usable bandwidth. Because the other communication device 1 is able to receive the measurement packets in a more stable manner, the receiving interval can be computed accurately. The communication device 1 is thus able to specify the usable bandwidth accurately.

The wide bandwidth measurement processing will be explained with reference to FIGS. 7 to 10. The bandwidth range is reset (Step S33). Because the usable bandwidth is located to the wide bandwidth side from the bandwidth range before the bandwidth range is reset, the bandwidth range is extended to the wide bandwidth side. The conditions are set for transmitting the measurement packets for measuring the bandwidths within the reset bandwidth range. Processing (binary search processing; refer to FIG. 8) is performed that selects the used bandwidth from among the plurality of bandwidths that have been selected within the bandwidth range that is within the reset bandwidth range and outside the bandwidth range before the bandwidth range was reset (Step S35). Hereinafter, the bandwidth range that is within the reset bandwidth range and outside the bandwidth range before the bandwidth range was reset is called the object bandwidth range.

Figure 8:
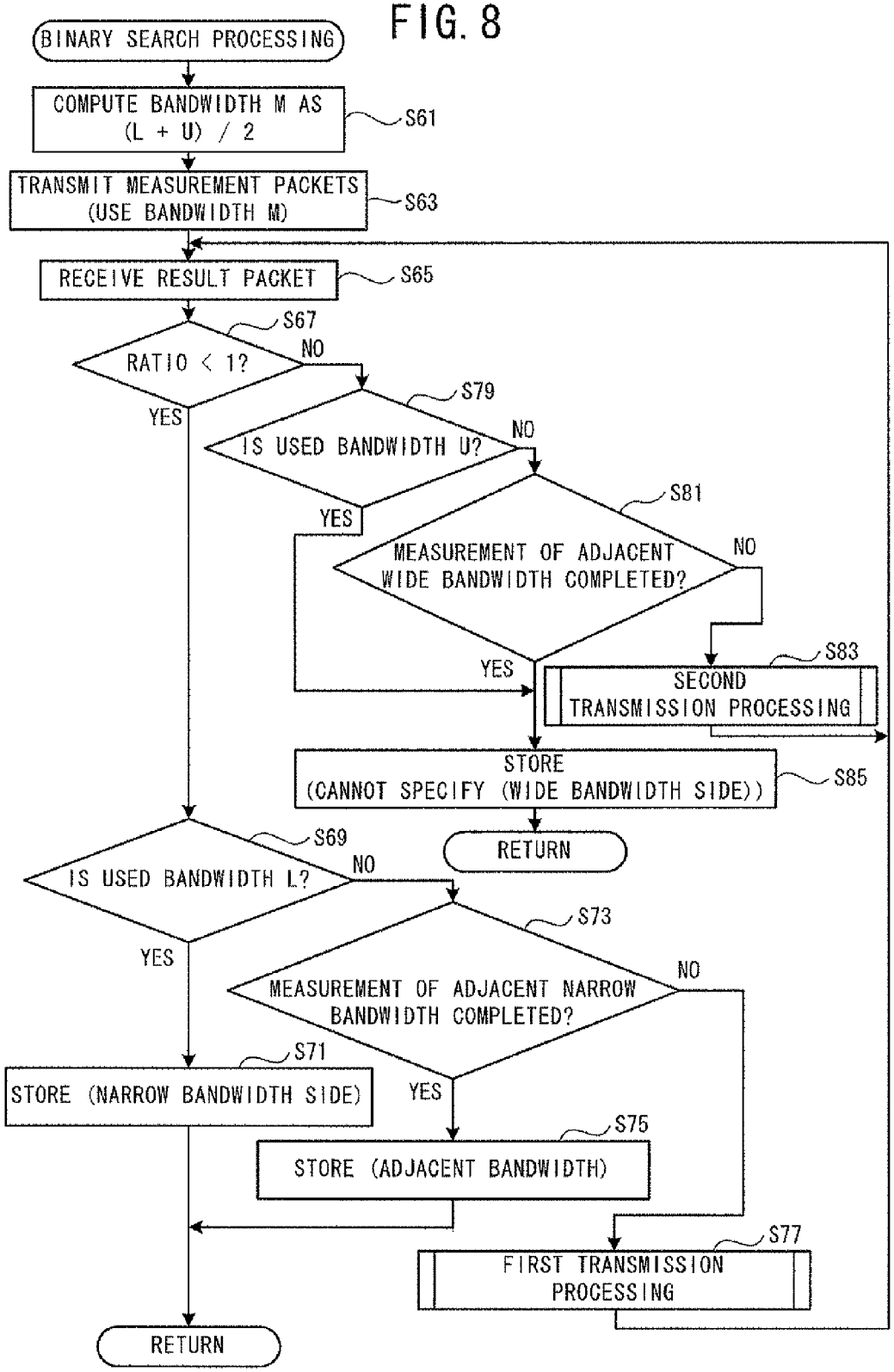
FIG. 8 is a flowchart that shows binary search processing.

The binary search processing will be explained with reference to FIG. 8. A bandwidth L that is located the farthest to the narrow bandwidth side, and a bandwidth U that is located the farthest to the wide bandwidth side are selected from among a plurality of bandwidths that are selected from within the object bandwidth range. A bandwidth M that is midway between the bandwidth L and the bandwidth U is computed based on the formula below.

$$M=(L+U)/2$$

The measurement packet is transmitted to the other communication device 1 using the computed bandwidth M as the used bandwidth (Step S63). The other communication device 1 receives the measurement packets and computes the ratio of the transmitting interval to the receiving interval. The result packet that contains the ratio is transmitted from the other communication device 1, and the result packet is received (Step S65). The ratio of the transmitting interval to the receiving interval that is contained in the received result packet is the ratio for the measurement packet that was transmitted using the used bandwidth.

In a case where the ratio of the transmitting interval to the receiving interval is less than 1 (YES at Step S67), the usable bandwidth is located to the narrow bandwidth side from the used bandwidth. A determination is made as to whether the used bandwidth matches the bandwidth L (Step S69). In a case where the used bandwidth does match the bandwidth L (YES at Step S69), the usable bandwidth is located to the narrow bandwidth side from the bandwidth L, and the usable bandwidth is not located within the object bandwidth range. In processing that will be described later (Steps S45, S47, S49, S53 (refer to FIG. 7)), a determination is made as to whether the usable bandwidth is located within the bandwidth range before the bandwidth range was reset (details will be described later). Information to the effect that the usable bandwidth is located to the narrow bandwidth side from the object bandwidth is stored in the RAM 12 (Step S71). The binary search processing is terminated, and the processing returns to the wide bandwidth measurement processing (refer to FIG. 7).

In a case where the used bandwidth does not match the bandwidth L (NO at Step S69), a determination is made as to whether the bandwidth that is adjacent to the used bandwidth on the narrow bandwidth side has already been measured (Step S73). In a case where the bandwidth that is adjacent to the used bandwidth on the narrow bandwidth side has already been measured (YES at Step S73), the ratio of the transmitting interval to the receiving interval for the measured bandwidth is always equal to 1. The bandwidth that is adjacent to the used bandwidth on the narrow bandwidth side is stored in the RAM 12 as the usable bandwidth (Step S75). The binary search processing is then terminated, and the processing returns to the wide bandwidth measurement processing (refer to FIG. 7). In a case where the bandwidth that is adjacent to the used bandwidth on the narrow bandwidth side has not yet been measured (NO at Step S73), the candidates for the usable bandwidth are narrowed down further to the narrow bandwidth side. Processing that measures the bandwidth using the bandwidth on the narrow bandwidth side that has not yet been measured (first transmission processing; refer to FIG. 9) is performed (Step S77).

Figure 9:
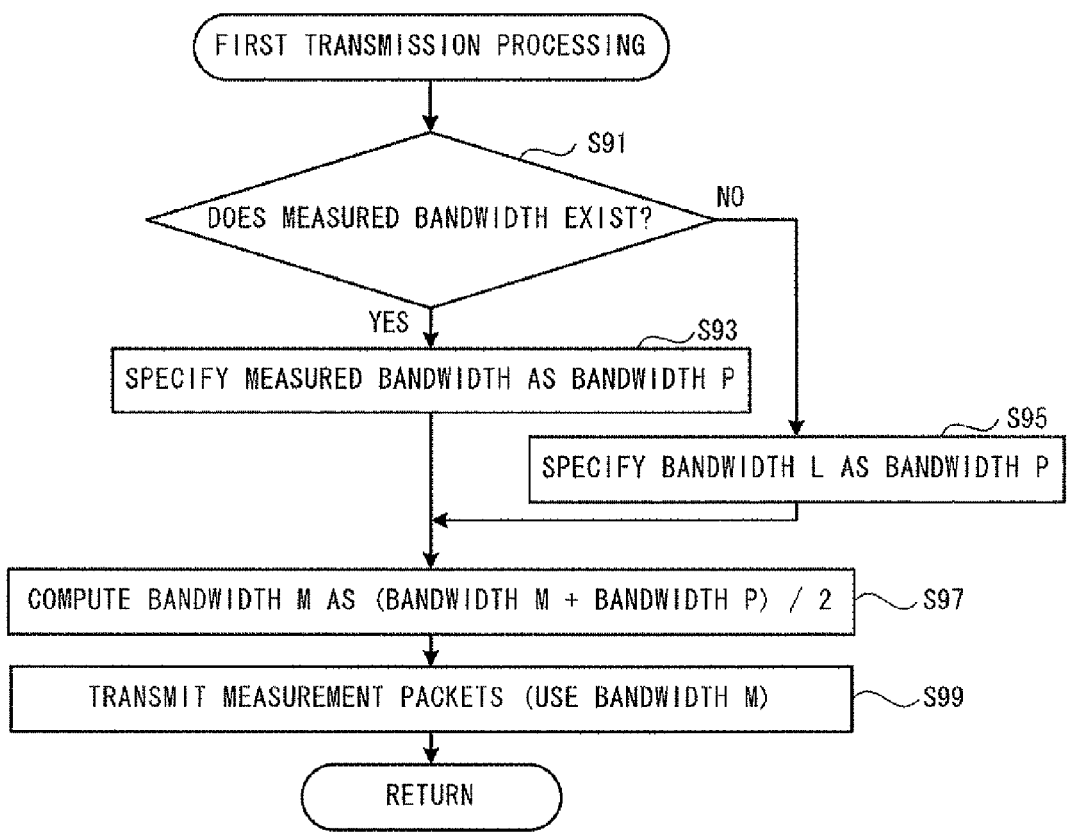
FIG. 9 is a flowchart that shows first transmission processing.

The first transmission processing will be explained with reference to FIG. 9. A determination is made as to whether an already measured bandwidth exists to the narrow bandwidth side from the used bandwidth (Step S91). In a case where an already measured bandwidth does exist to the narrow bandwidth side from the used bandwidth (YES at Step S91), the measured bandwidth is specified as a bandwidth P (Step S93). The processing advances to Step S97. In a case where an already measured bandwidth does not exist to the narrow bandwidth side from the used bandwidth (NO at Step S91), the bandwidth L is specified as the bandwidth P (Step S95). The processing advances to Step S97.

At Step S97, a bandwidth that is midway between the used bandwidth (the bandwidth M) and the bandwidth P is specified. The bandwidth M is then updated to the specified bandwidth (Step S97).

$$M=(M+P)/2$$

The measurement packet is transmitted using the updated bandwidth M as the used bandwidth (Step S99). The first transmission processing is then terminated, and the processing returns to the binary search processing (refer to FIG. 8). In the binary search processing, after the first transmission processing (Step S77) is terminated, the processing returns to Step S65.

At Step S67, in a case where the ratio of the transmitting interval to the receiving interval is equal to 1 (NO at Step S67), the usable bandwidth is located to the wide bandwidth side from the used bandwidth. A determination is made as to whether the used bandwidth matches the bandwidth U (Step S79). In a case where the used bandwidth does match the bandwidth U (YES at Step S79), the usable bandwidth is located to the wide bandwidth side from the bandwidth U, and the usable bandwidth is not located within the object bandwidth range. In this case, the usable bandwidth cannot be specified if the object bandwidth range is not extended to the wide bandwidth side. Information to the effect that the usable bandwidth is located to the wide bandwidth side from the object bandwidth and that the usable bandwidth cannot be specified is stored in the RAM 12 (Step S85). The binary search processing is terminated, and the processing returns to the wide bandwidth measurement processing (refer to FIG. 7).

In a case where the used bandwidth does not match the bandwidth U (NO at Step S79), a determination is made as to whether the bandwidth that is adjacent to the used bandwidth on the wide bandwidth side has already been measured (Step S81). In a case where the bandwidth that is adjacent to the used bandwidth on the wide bandwidth side has already been measured (YES at Step S81), the ratio of the transmitting interval to the receiving interval for the measured bandwidth is always less than 1. The used bandwidth is located to the wide bandwidth side from the bandwidth U, and the usable bandwidth is not located within the object bandwidth range. In this case, the usable bandwidth cannot be specified if the object bandwidth range is not extended to the wide bandwidth side. Information to the effect that the usable bandwidth is located to the wide bandwidth side from the object bandwidth and that the usable bandwidth cannot be specified is stored in the RAM 12 (Step S85). The binary search processing is terminated, and the processing returns to the wide bandwidth measurement processing (refer to FIG. 7). In a case where the bandwidth that is adjacent to the used bandwidth on the wide bandwidth side has not yet been measured (NO at Step S81), the candidates for the usable bandwidth are narrowed down further to the wide bandwidth side. Processing that measures the bandwidth using the bandwidth on the wide bandwidth side that has not yet been measured (second transmission processing; refer to FIG. 10) is performed (Step S83).

Figure 10:
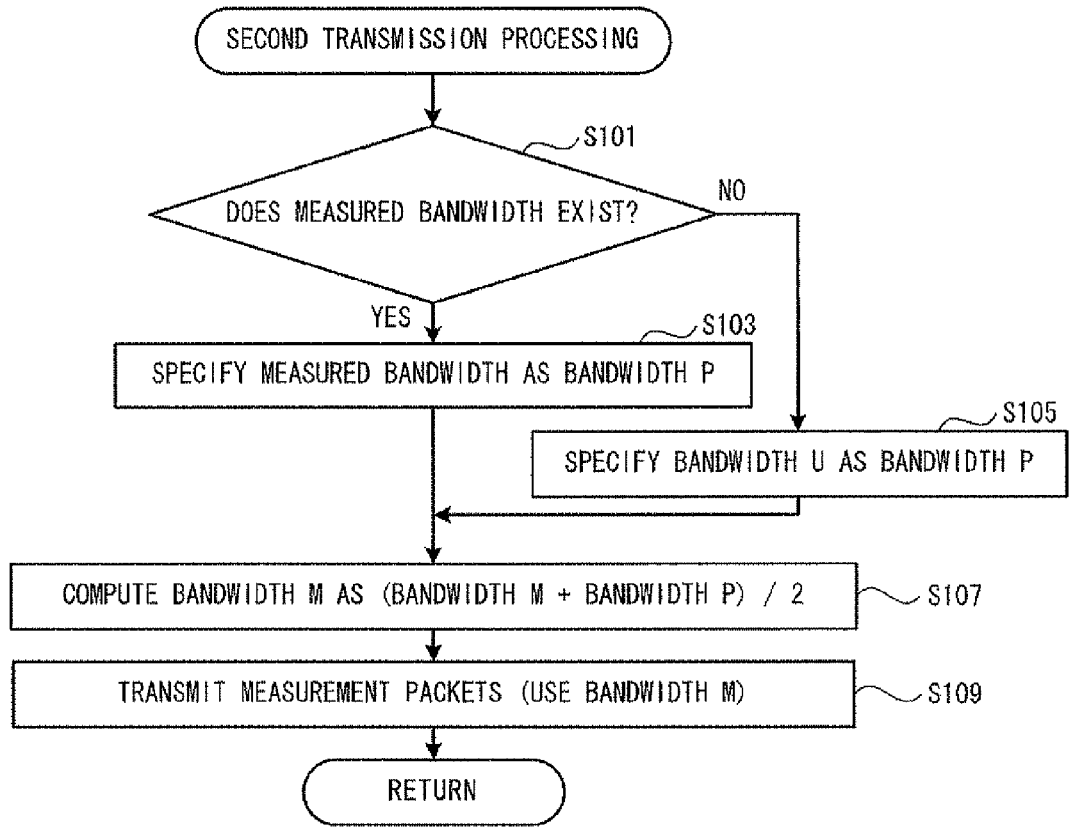
FIG. 10 is a flowchart that shows second transmission processing.

The second transmission processing will be explained with reference to FIG. 10. A determination is made as to whether an already measured bandwidth exists to the wide bandwidth side from the used bandwidth (Step S101). In a case where an already measured bandwidth does exist to the wide bandwidth side from the used bandwidth (YES at Step S101), the measured bandwidth is specified as the bandwidth P (Step S103). The processing advances to Step S107. In a case where an already measured bandwidth does not exist to the wide bandwidth side from the used bandwidth (NO at Step S101), the bandwidth U is specified as the bandwidth P (Step S105). The processing advances to Step S107.

At Step S107, a bandwidth that is midway between the used bandwidth (the bandwidth M) and the bandwidth P is specified. The bandwidth M is then updated to the specified bandwidth (Step S107).

$$M=(M+P)/2$$

The measurement packet is transmitted using the updated bandwidth M as the used bandwidth (Step S109). The second transmission processing is then terminated, and the processing returns to the binary search processing (refer to FIG. 8). In the binary search processing, after the second transmission processing (Step S83) is terminated, the processing returns to Step S65.

Figure 7:
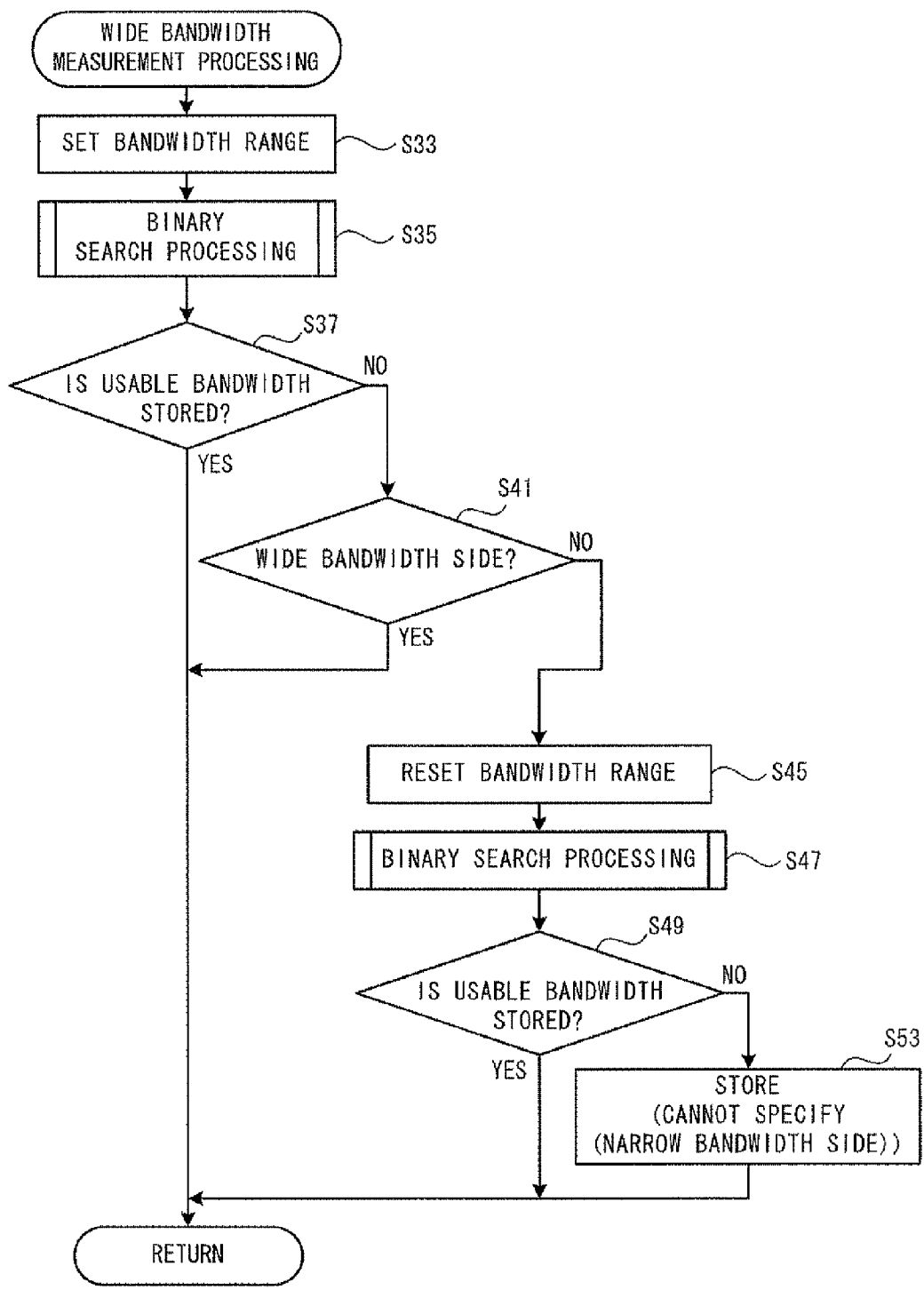
FIG. 7 is a flowchart that shows wide bandwidth measurement processing.

As shown in FIG. 7, after the binary search processing (Step S35) is terminated, a determination is made as to whether the usable bandwidth is stored in the RAM 12 (Step S37). In a case where the usable bandwidth is stored in the RAM 12 (Step S75; refer to FIG. 8) (YES at Step S37), the usable bandwidth has been specified, so the wide bandwidth measurement processing is terminated, and the processing returns to the main processing (refer to FIG. 5). In a case where information is stored in the RAM 12 to the effect that the usable bandwidth is located to the wide bandwidth side from the object bandwidth range (Step S85; refer to FIG. 8) (NO at Step S37; YES at Step S41), it is necessary to extend the object bandwidth range further to the wide bandwidth side and to perform the bandwidth measurements, so the wide bandwidth measurement processing is terminated, and the processing returns to the main processing (refer to FIG. 5).

In a case where information has been stored in the RAM 12 at Step S71 (refer to FIG. 8) to the effect that the usable bandwidth is located to the narrow bandwidth side from the object bandwidth range (Step S71; refer to FIG. 8) (NO at Step S41), it is necessary to shift the bandwidth range to the narrow bandwidth side and to perform the bandwidth measurements. The original bandwidth range before the bandwidth range was reset is once more set as the bandwidth range (Step S45). The binary search processing (refer to FIG. 8) is performed (Step S47), and an attempt is made to specify the usable bandwidth by measuring the bandwidths based on the original bandwidth range. After the binary search processing has been performed, a determination is made as to whether the usable bandwidth is stored in the RAM 12 (Step S49). In a case where the usable bandwidth has been stored in the RAM 12 at Step S75 (refer to FIG. 8) (YES at Step S49), the usable bandwidth has been specified, so the wide bandwidth measurement processing is terminated, and the processing returns to the main processing (refer to FIG. 5). In a case where information has been stored in the RAM 12 to the effect that the usable bandwidth is located to the narrow bandwidth side from the original bandwidth range (Step S71; refer to FIG. 8) (NO at Step S49), the usable bandwidth cannot be specified if the original bandwidth range is not extended to the narrow bandwidth side. Information to the effect that the usable bandwidth is located to the narrow bandwidth side from the original bandwidth range and that the usable bandwidth cannot be specified is stored in the RAM 12 (Step S53). The wide bandwidth measurement processing is then terminated, and the processing returns to the main processing (refer to FIG. 5).

By performing the processing that is described above, the communication device 1 is able to transmit the measurement packets giving priority to using the bandwidths within the object bandwidth range. Because there is a strong possibility that the usable bandwidth exists within the object bandwidth range, the communication device 1 is able to find the usable bandwidth efficiently and in a shorter time. Furthermore, by using the binary search processing to select the used bandwidth, the communication device 1 is ability to reliably measure the bandwidths within the bandwidth range, without any of the bandwidths being missed.

Figure 11:
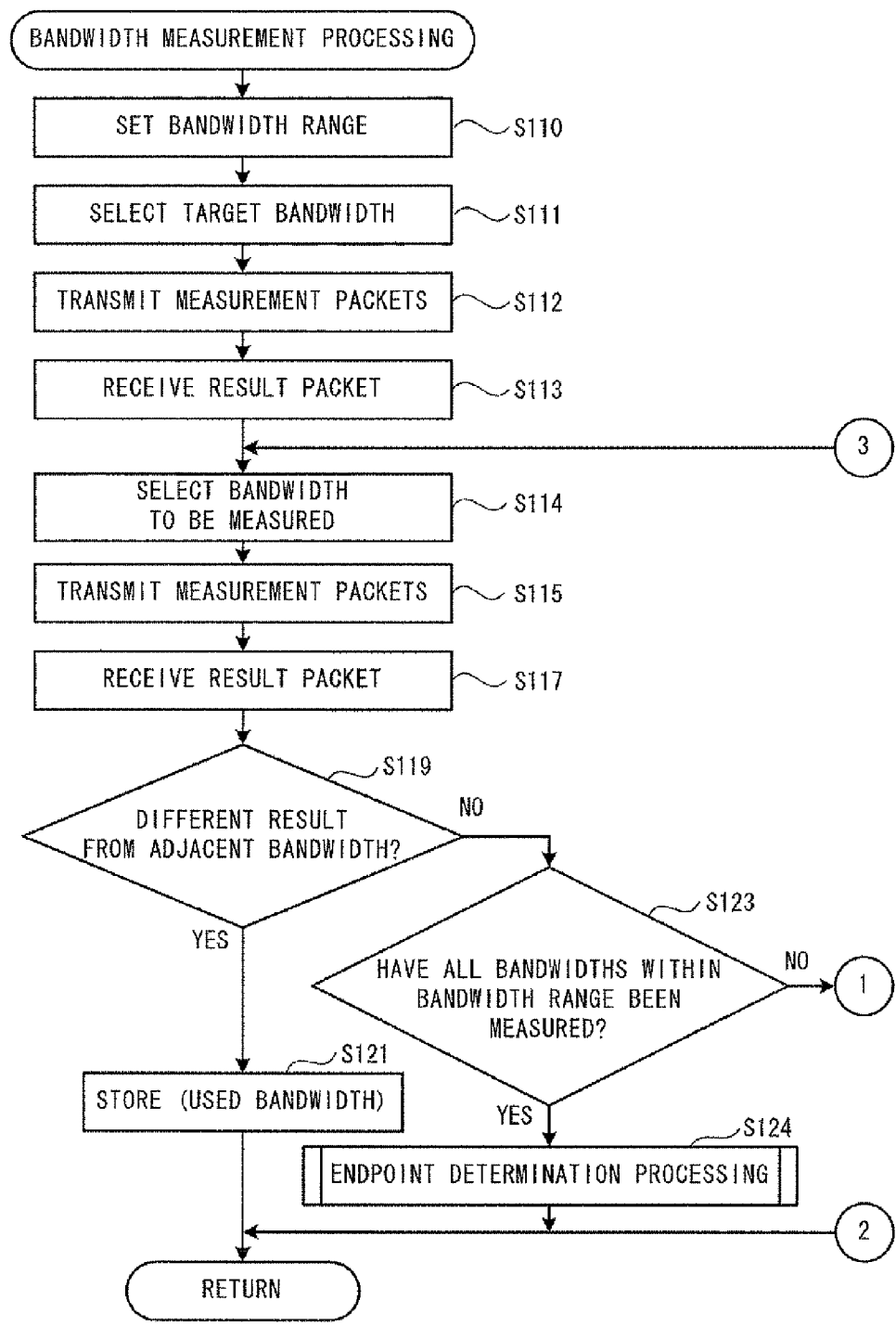
FIG. 11 is a flowchart that shows bandwidth measurement processing.

The bandwidth measurement processing will be explained with reference to FIGS. 11 and 12. The bandwidth range is reset (S110). Because the usable bandwidth is located within the bandwidth range before the bandwidth range was reset, the bandwidth range is reduced to a narrower range that includes the usable bandwidth. The conditions are set for transmitting the measurement packets for measuring the bandwidths within the reset bandwidth range. First, the bandwidth that, among the plurality of bandwidths that have been selected within the reset bandwidth range, is the closest to the specified usable bandwidth is specified as the target bandwidth. The specified target bandwidth is selected as the used bandwidth (Step S111). The measurement packet is transmitted to the other communication device 1 using the used bandwidth (Step S112). The other communication device 1 receives the measurement packets and transmits the result packet in reply. The result packet is received (Step S113). The ratio of the transmitting interval to the receiving interval that is contained in the received result packet is the ratio for the measurement packet that was transmitted using the used bandwidth.

The bandwidth is selected that is the closest to the target bandwidth among the not yet measured bandwidths that are located to the narrow bandwidth side from the target bandwidth (Step S114). The measurement packet is transmitted using the selected bandwidth as the used bandwidth (Step S115). The result packet that has been transmitted from the other communication device 1 is received (Step S117). A determination is made as to whether the ratio of the transmitting interval to the receiving interval that is contained in the result packet is different from the ratio when the bandwidth that is adjacent to the used bandwidth on the wide bandwidth side was used (Step S119). In a case where the ratios are different (YES at Step S119), the ratio has changed between the adjacent bandwidth and the used bandwidth. The used bandwidth is then specified as the new usable bandwidth. The new usable bandwidth is stored in the RAM 12 (Step S121). The bandwidth measurement processing is terminated, and the processing returns to the main processing (refer to FIG. 5).

In a case where the ratio that is contained in the received result packet matches the ratio when the bandwidth that is adjacent to the used bandwidth on the wide bandwidth side was used (NO at Step S119), a determination is made as to whether all of the bandwidths that have been selected from within the reset bandwidth range have been used as the used bandwidth (Step S123). In a case where the measurement packets have been transmitted using all of the bandwidths that have been selected from within the reset bandwidth range (YES at Step S123), the usable bandwidth is not located within the reset bandwidth range. Processing for specifying the location of the usable bandwidth in relation to the reset bandwidth range (endpoint determination processing; refer to FIG. 13) is performed (Step S124).

Figure 13:
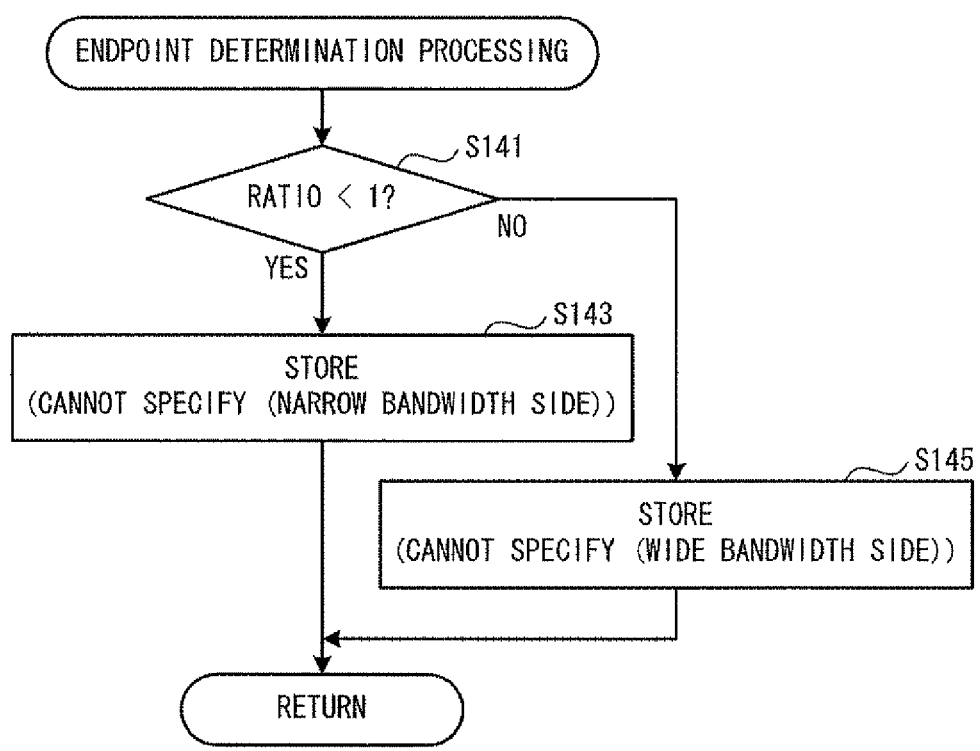
FIG. 13 is a flowchart that shows endpoint determination processing.

The endpoint determination processing will be explained with reference to FIG. 13. A determination is made as to whether the ratio of the transmitting interval to the receiving interval is less than 1 (Step S141). In a case where the ratio is less than 1 (YES at Step S141), the usable bandwidth is located to the narrow bandwidth side from the reset bandwidth range. Information to the effect that the usable bandwidth is located to the narrow bandwidth side from the reset bandwidth range and that the usable bandwidth cannot be specified is stored in the RAM 12 (Step S143). The endpoint determination processing is terminated, and the processing returns to the bandwidth measurement processing (refer to FIG. 11). In a case where the ratio is equal to 1 (NO at Step S141), the usable bandwidth is located to the wide bandwidth side from the reset bandwidth range. Information to the effect that the usable bandwidth is located to the wide bandwidth side from the reset bandwidth range and that the usable bandwidth cannot be specified is stored in the RAM 12 (Step S145). The endpoint determination processing is terminated, and the processing returns to the bandwidth measurement processing (refer to FIG. 11). As shown in FIG. 11, after the endpoint determination processing is terminated, the bandwidth measurement processing is terminated, and the processing returns to the main processing (refer to FIG. 5).

Figure 12:
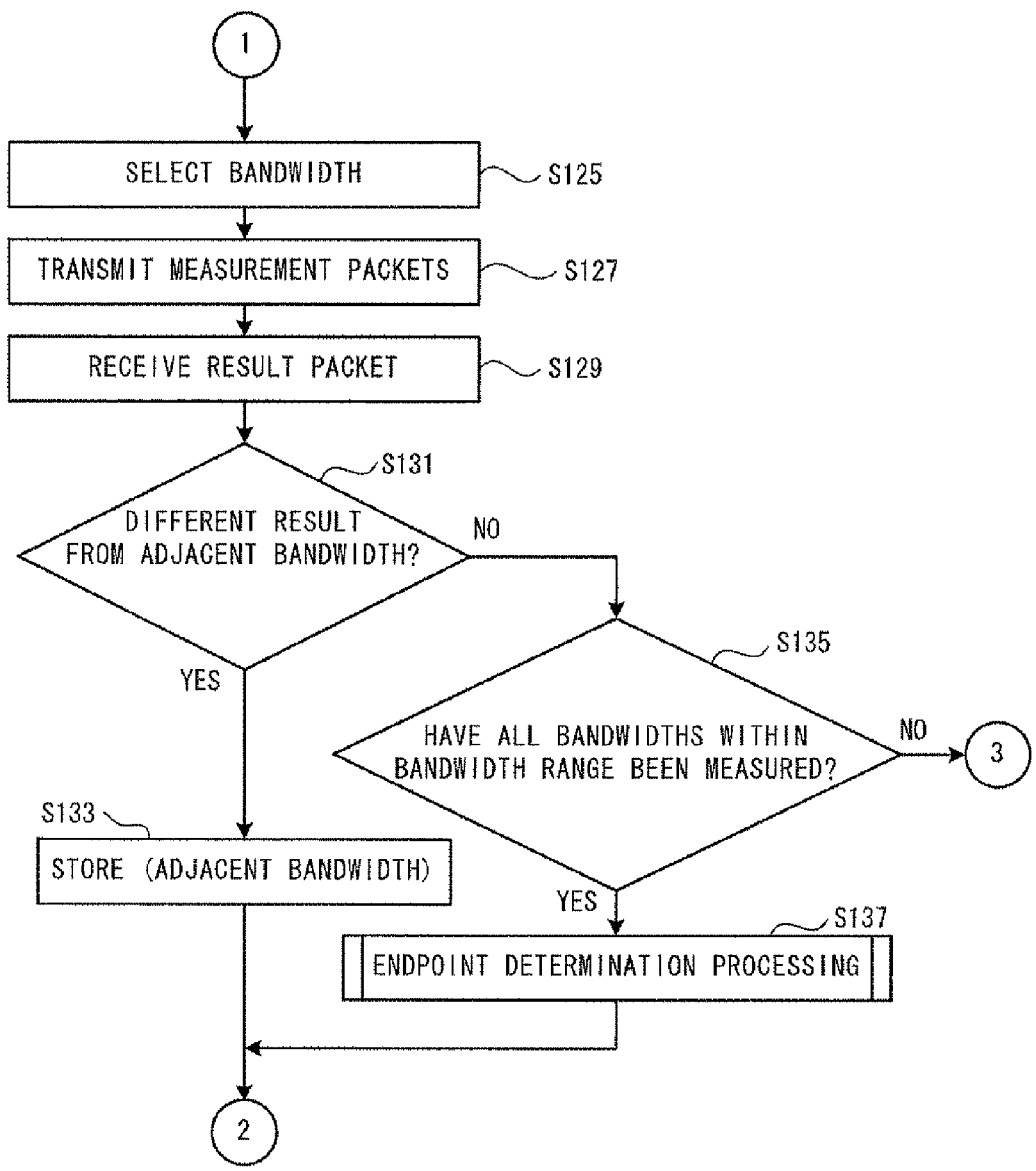
FIG. 12 is a flowchart that shows the bandwidth measurement processing, continuing from FIG. 11.

In a case where a determination is made at Step S123 that there are bandwidths remaining within the reset bandwidth range that have not been used as the used bandwidth (NO at Step S123), the processing proceeds to Step S125 (refer to FIG. 12). As shown in FIG. 12, at Step S125, the bandwidth is selected that is the closest to the target bandwidth among the not yet measured bandwidths that are located to the wide bandwidth side in relation to target bandwidth (Step S125). The measurement packet is transmitted using the selected bandwidth as the used bandwidth (Step S127). The result packet that has been transmitted from the other communication device 1 is received (Step S129). A determination is made as to whether the ratio of the transmitting interval to the receiving interval that is contained in the result packet is different from the ratio when the bandwidth that is adjacent to the used bandwidth on the narrow bandwidth side was used (Step S131). In a case where the ratios are different (YES at Step S131), the ratio has changed between the adjacent bandwidth and the used bandwidth. The bandwidth that is adjacent to the used bandwidth on the narrow bandwidth side is specified as the new usable bandwidth. The new usable bandwidth is stored in the RAM 12 (Step S133). The bandwidth measurement processing is terminated, and the processing returns to the main processing (refer to FIG. 5).

In a case where the ratio that is contained in the received result packet matches the ratio when the bandwidth that is adjacent to the used bandwidth on the narrow bandwidth side was used (NO at Step S131), a determination is made as to whether all of the bandwidths that have been selected from within the reset bandwidth range have been used as the used bandwidth (Step S135). In a case where the measurement packets have been transmitted using all of the bandwidths that have been selected from within the reset bandwidth range (YES at Step S135), the endpoint determination processing (refer to FIG. 13) is performed (Step S137). After the endpoint determination processing is terminated, the bandwidth measurement processing is terminated, and the processing returns to the main processing (refer to FIG. 5). In a case where there are bandwidths remaining that have been selected from within the reset bandwidth range and have not been used as the used bandwidth (NO at Step S135), the processing returns to Step S114 (refer to FIG. 11).

In a case like that described above, where the usable bandwidth is located within the bandwidth range before the bandwidth range is reset, priority is given to selecting, as the used bandwidth, those bandwidths that are close to the target bandwidth among the bandwidths that have been selected from within the reset bandwidth range. This makes it possible for the communication device 1 to specify the usable bandwidth immediately, even in a case where the usable bandwidth has changed. The communication device 1 is thus able to specify the usable bandwidth efficiently and in a shorter time.

Figure 5:
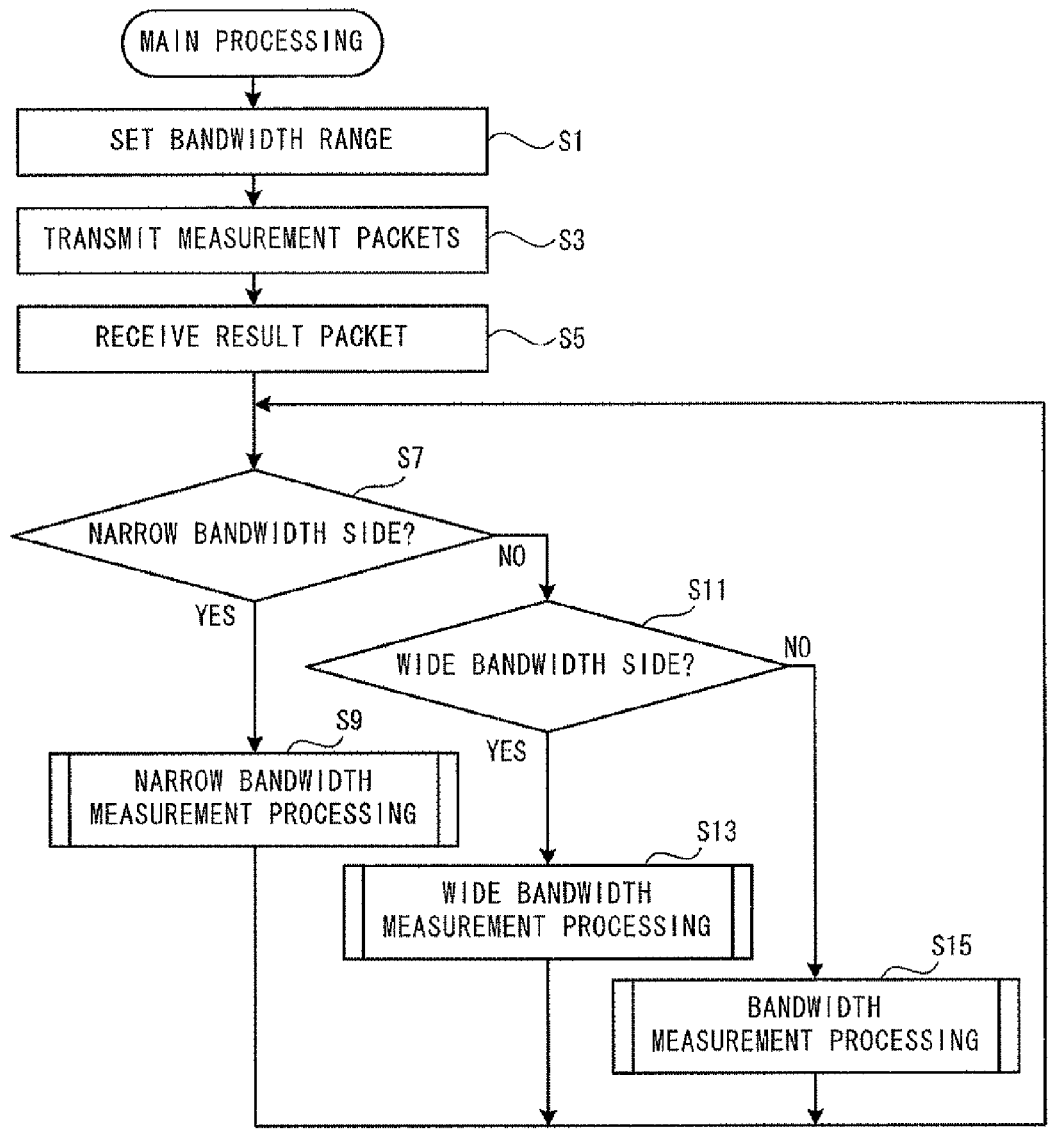
FIG. 5 is a flowchart of main processing.

As shown in FIG. 5, in the main processing, after the narrow bandwidth measurement processing (Step S9), the wide bandwidth measurement processing (Step S13), and the bandwidth measurement processing (Step S15) have been terminated, the processing returns to Step S7. In each of the types of measurement processing, in a case where it is determined that the usable bandwidth is located to the narrow bandwidth side from the reset bandwidth range (Step S29 (refer to FIG. 6); Step S53 (refer to FIG. 7); Step S143 (refer to FIG. 13)), the narrow bandwidth measurement processing (Step S9) is performed once more. In each of the types of measurement processing, in a case where it is determined that the usable bandwidth is located to the wide bandwidth side from the reset bandwidth range (Step S85 (refer to FIG. 8); Step S145 (refer to FIG. 13)), the wide bandwidth measurement processing (Step S13) is performed once more. In each of the types of measurement processing, in a case where it is determined that the usable bandwidth is located within the reset bandwidth range (Step S30 (refer to FIG. 6); Step S75 (refer to FIG. 8); Step S121 (refer to FIG. 11); Step S133 (refer to FIG. 12)), the bandwidth measurement processing (Step S15) is performed once more. After the usable bandwidth has been specified, the transmitting and receiving of the desired communication packets are performed between the communication devices 1 using the usable bandwidth.

Figure 14:
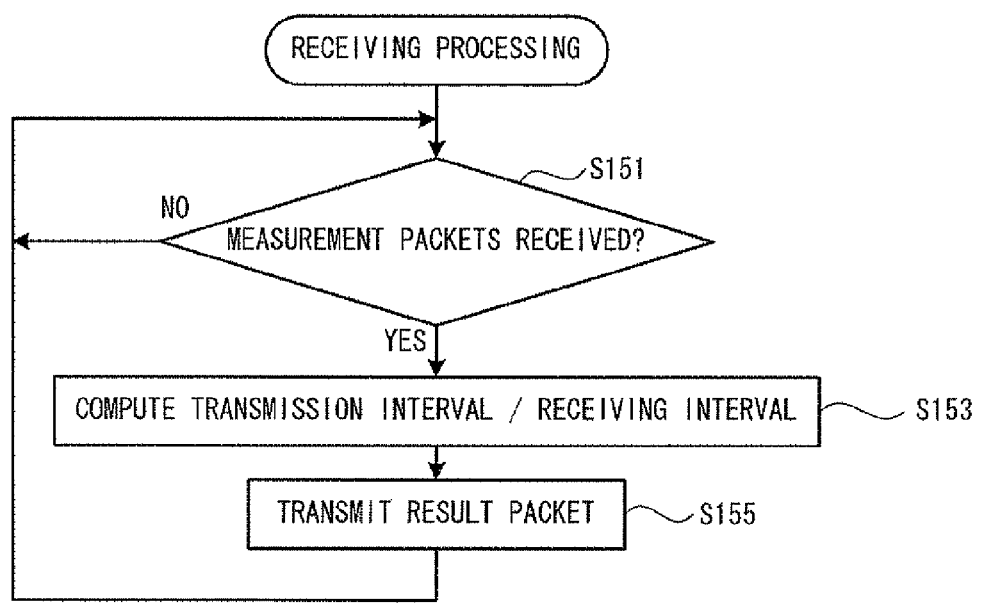
FIG. 14 is a flowchart that shows receiving processing.

The receiving processing will be explained with reference to FIG. 14. A determination is made as to whether the measurement packets have been received from the other communication device 1 (Step S151). In a state in which the measurement packets have not been received (NO at Step S151), the processing returns to Step S151. In a case where the measurement packets have been received (YES at Step S151), the transmitting intervals that are contained in the measurement packets are extracted. The time from when the preceding measurement packet was received until the current measurement packet was received (the receiving interval) is computed. The ratio of the transmitting interval to the receiving interval is computed (Step S153). The result packet that contains the ratio is transmitted to the other communication device 1 (Step S155). The processing returns to Step S151.

As explained previously, the communication device 1 attempts to specify the usable bandwidth by transmitting to the other communication device 1 pluralities of measurement packets for which the bandwidths that are used are different. The used bandwidth is selected as desired based on the positional relationship between the usable bandwidth and the bandwidth range before the bandwidth range is reset and on the positional relationship between the usable bandwidth and the bandwidth range after the bandwidth range is reset. The communication device 1 can change the used bandwidth according to the location of the usable bandwidth in the bandwidth range before and after the bandwidth range is reset. Unlike a case in which the used bandwidth is selected based on a uniform rule, the communication device 1 is able to select the optimum used bandwidth according to the location of the usable bandwidth in relation to the bandwidth range, and to use the selected bandwidth when transmitting the measurement packets. The communication device 1 is able to specify the usable bandwidth while maintaining a stable state of communication. The communication device 1 is also able to specify the usable bandwidth efficiently and in a short time.

Note that the present disclosure is not limited to the embodiment that is described above, and various types of modifications can be made. In the embodiment described above, in a case where the usable bandwidth is located in the bandwidth range before the bandwidth range is reset, the communication device 1 selects the used bandwidths in order from among the bandwidths that have been selected from within the reset bandwidth range, starting with the bandwidth that is the closest to the usable bandwidth, then uses the selected bandwidths when transmitting the measurement packets. The present disclosure is not limited to this method. For example, the communication device 1 may also select the used bandwidths such that the mean value of the used bandwidths for two sets of the measurement packets that are transmitted in succession matches the target bandwidth. Hereinafter, a modified example of the present embodiment will be explained. Note that for the portions of the processing that are the same as in the embodiment that is described above, the same reference numerals are used, and explanations will be one of omitted and simplified.

Figure 15:
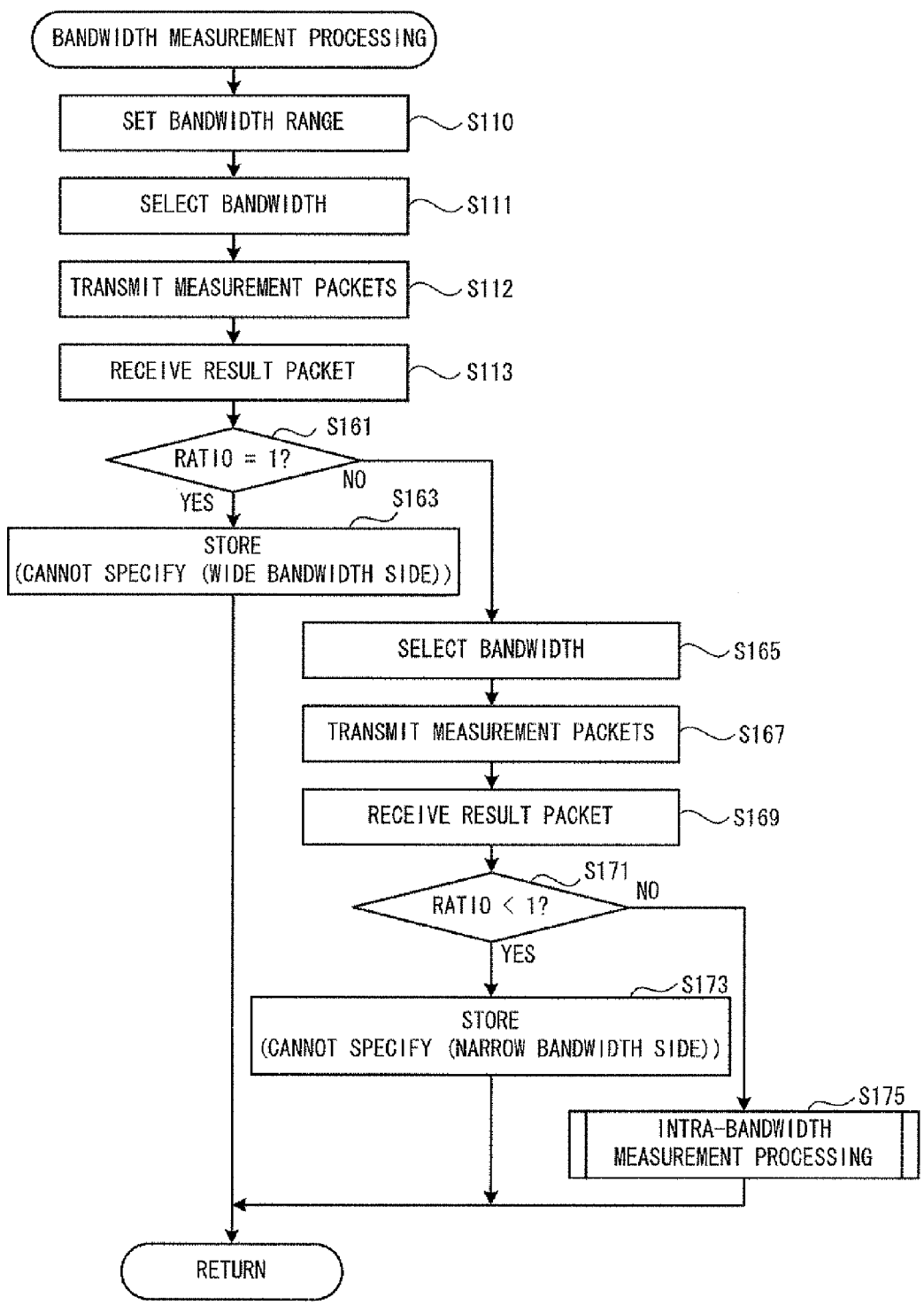
FIG. 15 is a flowchart that shows bandwidth measurement processing.

The bandwidth measurement processing in the modified example will be explained with reference to FIGS. 15 and 16. The bandwidth measurement processing is called in the main processing that is shown in FIG. 5. As shown in FIG. 15, the bandwidth range is reset (Step S110). Because the usable bandwidth is located within the bandwidth range before the bandwidth range was reset, the bandwidth range is reduced to a narrower range that includes the usable bandwidth. Note that in the modified example, the bandwidth range is set such that the target bandwidth is the median value.

The conditions are set for transmitting the measurement packets for measuring the bandwidths within the reset bandwidth range. First, the bandwidth that, among the plurality of bandwidths that have been selected within the reset bandwidth range, is the farthest to the wide bandwidth side is selected as the used bandwidth (Step S111). The measurement packet is transmitted to the other communication device 1 using the used bandwidth (Step S112). The result packet that is transmitted from the other communication device 1 is received (Step S113). A determination is made as to whether the ratio of the transmitting interval to the receiving interval that is contained in the received result packet is equal to 1 (Step S161). In a case where the ratio is equal to 1 (YES at Step S161), the usable bandwidth is located to the wide bandwidth side from the reset bandwidth range. Information to the effect that the usable bandwidth is located to the wide bandwidth side from the reset bandwidth range and that the usable bandwidth cannot be specified is stored in the RAM 12 (Step S163). The bandwidth measurement processing is terminated, and the processing returns to the main processing (refer to FIG. 5).

In a case where the ratio that is contained in the received result packet is less than 1 NO at Step S161), the bandwidth that is the farthest to the narrow bandwidth side of the reset bandwidth range is selected as the used bandwidth (Step S165). Note that the target bandwidth is the median value in the reset bandwidth range. Therefore, the mean value ((W1+W2)/2) of the used bandwidth (W1) that was selected at Step S111 and the used bandwidth (W2) that was selected at Step S165 becomes the target bandwidth.

The measurement packet is transmitted to the other communication device 1 using the selected used bandwidth (Step S167). The result packet that has been transmitted from the other communication device 1 is received (Step S169). In a case where the ratio of the transmitting interval to the receiving interval that is contained in the received result packet is less than 1 (YES at Step S171), the usable bandwidth is located to the narrow bandwidth side from the reset bandwidth range. Information to the effect that the usable bandwidth is located to the narrow bandwidth side from the reset bandwidth range and that the usable bandwidth cannot be specified is stored in the RAM 12 (Step S173). The bandwidth measurement processing is terminated, and the processing returns to the main processing (refer to FIG. 5). In a case where the ratio of the transmitting interval to the receiving interval that is contained in the received result packet is equal to 1 (NO at Step S171), the usable bandwidth is located within the reset bandwidth range. Processing that specifies the usable bandwidth more specifically within the reset bandwidth range (intra-bandwidth measurement processing) is performed (Step S175). After the intra-bandwidth measurement processing is terminated, the processing returns to the main processing (refer to FIG. 5).

Figure 16:
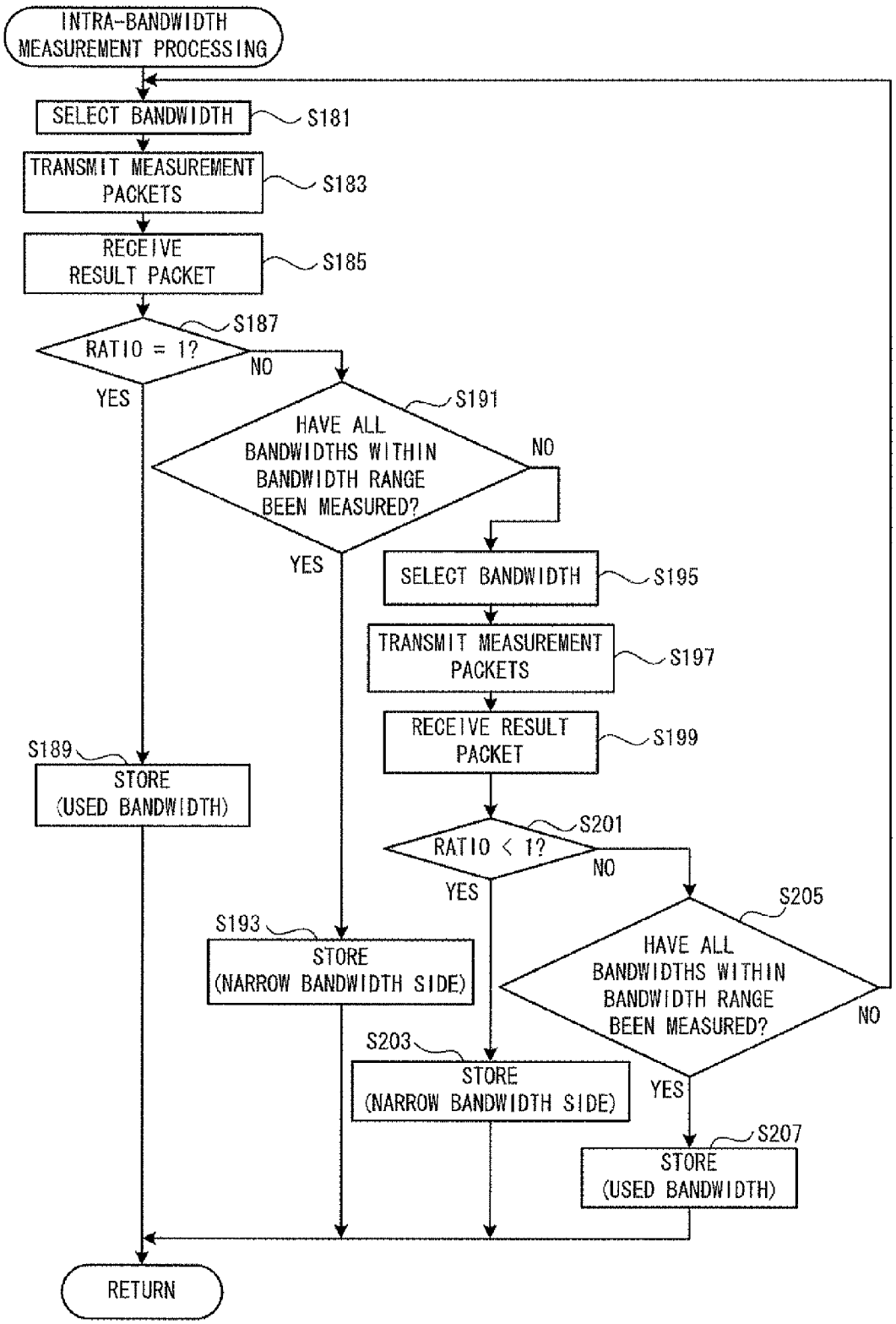
FIG. 16 is a flowchart that shows intra-bandwidth measurement processing.

As shown in FIG. 16, in the intra-bandwidth measurement processing, the bandwidth that is the farthest to the wide bandwidth side among the not yet measured bandwidths that have been selected from within the reset bandwidth range is selected as the used bandwidth (Step S181). The measurement packet is transmitted to the other communication device 1 using the selected used bandwidth (Step S183), and the result packet is received (Step S185). In a case where the ratio of the transmitting interval to the receiving interval that is contained in the received result packet is equal to 1 (YES at Step S187), the ratio has changed between the used bandwidth and the bandwidth that is adjacent to the used bandwidth on the wide bandwidth side. The used bandwidth is specified as the new usable bandwidth. The new usable bandwidth is stored in the RAM 12 (Step S189). The intra-bandwidth measurement processing is terminated, and the processing returns to the bandwidth measurement processing (refer to FIG. 15).

In a case where the ratio is less than 1 (NO at Step S187), a determination is made as to whether the measurement packets have been transmitted using all of the bandwidths that have been selected from within the reset bandwidth range as the used bandwidth (Step S191). In a case where all of the bandwidths within the bandwidth range have been used as the used bandwidth (YES at Step S191), the ratio has changed between the used bandwidth and the bandwidth that is adjacent to the used bandwidth on the narrow bandwidth side. The bandwidth that is adjacent to the used bandwidth on the narrow bandwidth side is specified as the new usable bandwidth. The new usable bandwidth is stored in the RAM 12 (Step S193). The intra-bandwidth measurement processing is terminated, and the processing returns to the bandwidth measurement processing (refer to FIG. 15).

In a case where there are bandwidths remaining within the reset bandwidth range that have not been selected as the used bandwidth (NO at Step S191), the bandwidth that is the farthest to the narrow bandwidth side among the not yet measured bandwidths that have been selected from within the reset bandwidth range is selected as the used bandwidth (Step S195). Note that the target bandwidth is the median value in the reset bandwidth range, so the mean value of the used bandwidth that was selected at Step S181 and the used bandwidth that was selected at Step S195 becomes the target bandwidth.

The measurement packet is transmitted to the other communication device 1 using the selected used bandwidth (Step S197), and the result packet is received (Step S199). In a case where ratio that is contained in the result packet is less than 1 (YES at Step S201), the ratio has changed between the used bandwidth and the bandwidth that is adjacent to the used bandwidth on the narrow bandwidth side. The bandwidth that is adjacent to the used bandwidth on the narrow bandwidth side is specified as the new usable bandwidth. The new usable bandwidth is stored in the RAM 12 (Step S203). The intra-bandwidth measurement processing is terminated, and the processing returns to the bandwidth measurement processing (refer to FIG. 15).

In a case where ratio that is contained in the result packet is equal to 1 (NO at Step S201), a determination is made as to whether the measurement packets have been transmitted using all of the bandwidths that have been selected from within the reset bandwidth range as the used bandwidth (Step S205). In a case where all of the bandwidths that have been selected from within the bandwidth range have been used as the used bandwidth (YES at Step S205), the ratio has changed between the used bandwidth and the bandwidth that is adjacent to the used bandwidth on the wide bandwidth side. The used bandwidth is specified as the new usable bandwidth. The new usable bandwidth is stored in the RAM 12 (Step S207). The intra-bandwidth measurement processing is terminated, and the processing returns to the bandwidth measurement processing (refer to FIG. 15). In a case where there are bandwidths remaining, among the bandwidths that have been selected from within the reset bandwidth range, that have not been selected as the used bandwidth (NO at Step S205), the processing returns to Step S181.

In the modified example, as explained above, in a case where the pluralities of measurement packets are transmitted in succession from the communication device 1, the used bandwidths are selected such that the mean value of the used bandwidths becomes the target bandwidth. Thus the communication device 1 can average the values of the bandwidths that are used for the measurement packets that are transmitted within a fixed time interval. The communication device 1 is able to maintain a fixed number of measurement packets that are transmitted within the fixed time interval. The communication device 1 is therefore able to transmit the data in a stable manner.

The communication that uses the measurement packets as described above may use dedicated packets, and it may also use, as the measurement packets, the packets that are transmitted and received between the communication devices 1 in a video conference, for example. The measurement packets may be transmitted and received between the communication devices 1 through a server, and they may also be transmitted and received directly between the communication devices 1.

In the embodiment that is described above, in a case where the usable bandwidth is located to the narrow bandwidth side from the bandwidth range before the bandwidth range is reset, the bandwidth range is reset by extending the original bandwidth range to the narrow bandwidth side. In a case where the usable bandwidth is located to the wide bandwidth side from the bandwidth range before the bandwidth range is reset, the bandwidth range is reset by extending the original bandwidth range to the wide bandwidth side. The present disclosure is not limited to this method. In a case where the usable bandwidth is located to the narrow bandwidth side from the bandwidth range before the bandwidth range is reset, a new bandwidth range may be set to the narrow bandwidth side from the original bandwidth range. In a case where the usable bandwidth is located to the wide bandwidth side from the bandwidth range before the bandwidth range is reset, a new bandwidth range may be set to the wide bandwidth side from the original bandwidth range.

In the embodiment that is described above, in a case where the original bandwidth range has been extended to the narrow bandwidth side, the communication device 1 selects the used bandwidths from within the reset bandwidth range in order from the narrow bandwidth side to the wide bandwidth side. In a case where the original bandwidth range has been extended to the wide bandwidth side, the communication device 1 selects the used bandwidths from within the reset bandwidth range in the order that is determined by the binary search. The present disclosure is not limited to this method. In a case where the original bandwidth range has been extended to the narrow bandwidth side, the communication device 1 may also select the used bandwidths from within the reset bandwidth range in the order that is determined by the binary search. In a case where the original bandwidth range has been extended to the wide bandwidth side, the communication device 1 may also select the used bandwidths from within the reset bandwidth range in order from the narrow bandwidth side to the wide bandwidth side. The communication device 1 may also switch between the two methods as desired.

In the embodiment that is described above, in a case where the usable bandwidth is located within the bandwidth range before the bandwidth range is reset, the new used bandwidth is selected by searching for the bandwidth that is the closest to the target bandwidth, with the search alternating between the narrow bandwidth side and the wide bandwidth side in relation to the target bandwidth. However, the present disclosure is not limited to this method. If the ratio of the transmitting interval to the receiving interval is less than 1 in a case where the target bandwidth is used as the used bandwidth, the used bandwidth may be selected by searching only for the bandwidths on the narrow bandwidth side in relation to the target bandwidth. If the ratio is equal to 1 in a case where the target bandwidth is used as the used bandwidth, the used bandwidth may be selected by searching only for the bandwidths on the wide bandwidth side in relation to the target bandwidth. These methods make it possible for the communication device 1 to specify the usable bandwidth in a shorter time.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication device configured to be connected to a network, comprising:
   a processor, and
   a memory storing computer-readable instructions,
   wherein when the computer-readable instructions are executed by the processor, the processor is configured to:
   make a first transmission of a plurality of groups of packets to another communication device, each of the plurality of groups of packets including a plurality of measurement packets that are transmitted with a transmitting interval, transmitting intervals of the plurality of groups of packets differing from each other;
   make a first determination of a location of a usable bandwidth in relation to a first bandwidth range, based on a result packet that is transmitted from the other communication device in response to the first transmission, the first bandwidth range being a range within which bandwidths are measured, the usable bandwidth being one of the bandwidths that can be used in the network, and the result packet containing information that pertains to a relationship between the transmitting interval and a receiving interval at which the plurality of groups of packets are received by the other communication device;
   reset the first bandwidth range to a second bandwidth range in accordance with a determination that has been made by the first determination, the second bandwidth range being a range within which the bandwidths are to be measured and in which at least one of an upper limit and a lower limit is different from the corresponding limit in the first bandwidth range;
   select, in order to determine whether the usable bandwidth is located within the second bandwidth range that has been set by the resetting, a bandwidth from among a plurality of bandwidths that have been selected from within the second bandwidth range and based on the setting by the resetting, the bandwidth being used when a group of packets is transmitted to the other communication device; and make a second transmission of the group of packets to the other communication device using the bandwidth that has been selected by the selecting.

2. The communication device according to claim 1, wherein when the computer-readable instructions are executed by the processor, the processor is configured to:

make a second determination of whether the usable bandwidth can be specified within the first bandwidth range, based on the result packet that was transmitted from the other communication device in response to the first transmission, and select a next bandwidth based on a determination that has been made by the second determination.

3. The communication device according to claim 2, wherein in a case where it has been determined by the first determination that the usable bandwidth is located to a narrow bandwidth side from the first bandwidth range and where the second bandwidth range has been set by the resetting, the processor is configured to make a first selection of the bandwidth that is the farthest to the narrow bandwidth side from among the plurality of bandwidths that have been selected from within the second bandwidth range.

4. The communication device according to claim 3, wherein in a case where it has been determined by the second determination that the usable bandwidth cannot be specified, the processor is configured to select as the next bandwidth, from among the plurality of bandwidths that have been selected from within the second bandwidth range, the bandwidth that is the farthest to the narrow bandwidth side among the bandwidths that have not yet been selected by the selecting.

5. The communication device according to claim 2, wherein in a case where it has been determined by the first determination that the usable bandwidth is located to a wide bandwidth side from the first bandwidth range and where the second bandwidth range has been reset by the resetting, the processor is configured to select, from among the plurality of bandwidths that have been selected from within the second bandwidth range, one of the bandwidths that are within the second bandwidth range and the outside the first bandwidth range.

6. The communication device according to claim 5, wherein in a case where it has been determined by the second determination that the usable bandwidth cannot be specified, the processor is configured to select as the next bandwidth, from among the plurality of bandwidths within the second bandwidth range that are the outside the first bandwidth range, a bandwidth that is found by a binary search.

7. The communication device according to claim 2, wherein in a case where it has been determined by the first determination that the usable bandwidth is located within the first bandwidth range and where the second bandwidth range has been reset by the resetting, the processor is configured to select, from among the plurality of bandwidths that have been selected from within the second bandwidth range, a target bandwidth that is the bandwidth that is the closest to the usable bandwidth.

8. The communication device according to claim 7, wherein in a case where it has been determined by the second determination that the usable bandwidth cannot be specified, the processor is configured to select as the next bandwidth, from among the plurality of bandwidths that have been selected from within the second bandwidth range, the bandwidth that is the closest to the target bandwidth among the bandwidths that have not yet been selected by the selecting.

9. The communication device according to claim 7, wherein the processor is configured to select as the next bandwidth a bandwidth for which the mean value of the bandwidth and the bandwidth that was selected previously is the closest to the target bandwidth.

10. A communication method, comprising:

performing a first transmission of a plurality of groups of packets to another communication device that is configured to be connected to a network, each of the plurality of groups of packets including a plurality of measurement packets that are transmitted with a transmitting interval, transmitting intervals of the plurality of groups of packets differing from each other;

determining a location of a usable bandwidth in relation to a first bandwidth range in response to the first transmission, based on a result packet that is transmitted from the other communication device, the first bandwidth range being a range within which bandwidths are measured, the usable bandwidth being one of the bandwidths that can be used in the network, and the result packet containing information that pertains to a relationship between the transmitting interval and a receiving interval at which the plurality of groups of packets are received by the other communication device;

resetting the first bandwidth range to a second bandwidth range in accordance with the determining of the location of the usable bandwidth in relation to the first bandwidth range, the second bandwidth range being a range within which the bandwidths are to be measured and in which at least one of an upper limit and a lower limit is different from the corresponding limit in the first bandwidth range;

selecting a bandwidth from among a plurality of bandwidths that have been selected from within the second bandwidth range and based on the setting of the second bandwidth range, the bandwidth being used when a group of packets is transmitted to the other communication device, in order to determine whether the usable bandwidth is located within the second bandwidth range that has been set; and performing a second transmission of the group of packets to the other communication device using the selected bandwidth.

11. A non-transitory computer-readable storage medium that stores a computer-executable program for communication device that is configured to be connected to a network to carry out communication with another communication device, the program comprising instructions for:

performing a first transmission of a plurality of groups of packets to another communication device that is configured to be connected to a network, each of the plurality of groups of packets including a plurality of measurement packets that are transmitted with a transmitting interval, transmitting intervals of the plurality of groups of packets differing from each other;

determining a location of a usable bandwidth in relation to a first bandwidth range in response to the first transmission, based on a result packet that is transmitted from the other communication device, the first bandwidth range being a range within which bandwidths are measured, the usable bandwidth being one of the bandwidths that can be used in the network, and the result packet containing information that pertains to a relationship between the transmitting interval and a receiving interval at which the plurality of groups of packets are received by the other communication device;

resetting the first bandwidth range to a second bandwidth range in accordance with the determining of the location of the usable bandwidth in relation to the first bandwidth range, the second bandwidth range being a range within which the bandwidths are to be measured and in which at least one of an upper limit and a lower limit is different from the corresponding limit in the first bandwidth range;

selecting a bandwidth from among a plurality of bandwidths that have been selected from within the second bandwidth range and based on the setting of the second bandwidth range, the bandwidth being used when a group of packets is transmitted to the other communication device, in order to determine whether the usable bandwidth is located within the second bandwidth range that has been set; and performing a second transmission of the group of packets to the other communication device using the selected bandwidth.

\* \* \* \* \*